(12) United States Patent
Akita et al.

(10) Patent No.: US 9,816,450 B2
(45) Date of Patent: Nov. 14, 2017

(54) FUEL VAPOR PROCESSING APPARATUS

(71) Applicant: AISAN KOGYO KABUSHIKI KAISHA, Obu-shi, Aichi-ken (JP)

(72) Inventors: Minoru Akita, Ama (JP); Yoshikazu Miyabe, Obu (JP); Naoyuki Tagawa, Nagoya (JP); Junya Kimoto, Obu (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 0 days.

(21) Appl. No.: 15/038,898

(22) PCT Filed: Oct. 3, 2014

(86) PCT No.: PCT/JP2014/076542
§ 371 (c)(1),
(2) Date: May 24, 2016

(87) PCT Pub. No.: WO2015/076027
PCT Pub. Date: May 28, 2015

(65) Prior Publication Data
US 2016/0356227 A1    Dec. 8, 2016

(30) Foreign Application Priority Data

Nov. 25, 2013 (JP) ................... 2013-242850

(51) Int. Cl.
*F02D 41/00* (2006.01)
*F02M 25/08* (2006.01)
*B60K 15/035* (2006.01)

(52) U.S. Cl.
CPC ...... *F02D 41/004* (2013.01); *B60K 15/03504* (2013.01); *F02M 25/0836* (2013.01);
(Continued)

(58) Field of Classification Search
CPC ............ F02D 41/004; B60K 15/03504; F02M 25/0854; F02M 25/0872; F02M 25/0836; F02M 2025/0845
See application file for complete search history.

(56) References Cited

U.S. PATENT DOCUMENTS 5,275,144 A * 1/1994 Gross ................. F02M 25/0809
                                               123/198 D
9,689,324 B2 * 6/2017 Akita .................... F02D 41/003
(Continued)

FOREIGN PATENT DOCUMENTS

JP      H5-33729 A       2/1993
JP      10-266908 A      10/1998
(Continued)

OTHER PUBLICATIONS

International Patent Application No. PCT/JP2014/076542 International Search Report dated Dec. 2, 2014 (5 pages).
(Continued)

*Primary Examiner* — Joseph Dallo
(74) *Attorney, Agent, or Firm* — Conley Rose, P.C.

(57) ABSTRACT

A fuel vapor processing apparatus includes a canister housing an adsorbent material that adsorbs fuel vapor from a tank, and a valve in a passage connecting the canister and tank. When a stroke amount is within a range, the valve is closed to close the tank and a valve opening start position is learned. In the learning, the stroke amount is varied in the opening direction by repeatedly changing in the opening direction by a first stroke and maintaining for a first time period, and subsequently changing in a closing direction by a second stroke and maintaining for a second time period. The valve opening start position is determined based on the
(Continued)

stroke amount in the second time period when the tank pressure is reduced by the predetermined value or more or in a preceding process.

10 Claims, 18 Drawing Sheets

(52) U.S. Cl.
CPC .... *F02M 25/0854* (2013.01); *F02M 25/0872* (2013.01); *F02M 2025/0845* (2013.01)

(56) References Cited

U.S. PATENT DOCUMENTS

| | | |
|---|---|---|
| 2011/0203554 A1 | 8/2011 | Horiba et al. |
| 2011/0220071 A1 | 9/2011 | Horiba et al. |
| 2015/0143996 A1* | 5/2015 | Kimoto .............. B01D 53/0454 96/114 |
| 2015/0159566 A1* | 6/2015 | Akita ................... F02D 41/003 137/488 |
| 2015/0159567 A1* | 6/2015 | Akita ................... F02D 41/003 137/624.27 |
| 2015/0159568 A1* | 6/2015 | Tagawa ................ F02D 41/003 137/624.27 |
| 2015/0159598 A1* | 6/2015 | Tagawa .............. F02M 25/0854 123/520 |
| 2016/0298577 A1* | 10/2016 | Kimoto .............. F02M 25/0836 |

FOREIGN PATENT DOCUMENTS

| | | |
|---|---|---|
| JP | 2005-248911 A | 9/2005 |
| JP | 2011-169276 A | 9/2011 |
| JP | 2011-256778 A | 12/2011 |
| JP | 2013-104316 A | 5/2013 |

OTHER PUBLICATIONS

German Patent Application No. 11 2014 005 351.1 Office Action dated Jul. 5, 2017 (5 pages).

\* cited by examiner

FUEL VAPOR PROCESSING APPARATUS

CROSS-REFERENCE TO RELATED APPLICATIONS

The present application is a National Phase entry of, and claims priority to, PCT Applicant No. PCT/JP2014/076542, filed Oct. 3, 2014, which claims priority to Japanese Patent Application No. 2013-242850, filed Nov. 25, 2013, both of which are incorporated herein by reference in their entireties.

STATEMENT REGARDING FEDERALLY SPONSORED RESEARCH OR DEVELOPMENT

Not applicable.

BACKGROUND

The present invention relates to a fuel vapor processing apparatus provided with a canister that is provided with an adsorbent material for adsorbing fuel vapor generated in a fuel tank, and a shutoff valve provided in a vapor passage that connects the canister and the fuel tank.

A related conventional fuel vapor processing apparatus is disclosed in Japanese Laid-Open Patent Publication No. 2011-256778. This fuel vapor processing apparatus is provided with a shutoff valve (control valve) disposed in a vapor passage connecting a canister and a fuel tank. The shutoff valve is provided with a dead band region (valve closing region) cutting off the fuel vapor, and a conducting region (valve opening region) allowing passage of the fuel vapor. In the valve closing state, the fuel tank is maintained in a sealingly closed state, and, in the valve opening state, the fuel vapor of the fuel tank is released to the canister side, making it possible to reduce the internal pressure of the fuel tank. The fuel vapor processing apparatus performs a learning control in which the degree of opening of the shutoff valve is changed at a predetermined speed in the opening direction from the valve closing position, and in which, when the internal pressure of the fuel tank starts to be reduced, the degree of opening of the shutoff valve is stored as the valve opening start position.

However, as compared with the valve opening start time of the shutoff valve, the detection time of the reduction in the internal pressure of the fuel tank is delayed. Therefore, in a learning method in which a stroke amount which is the axial distance of a movable valve portion with respect to a valve seat is gradually changed, it is expected that the shutoff valve is somewhat open from the valve opening start position at the time when the reduction in the internal pressure of the fuel tank is detected. Therefore, there has been a problem that the learning control accuracy for the valve opening start position in the shutoff valve is low.

As a result, there has been a need to improve a learning accuracy for a valve opening start position in a shutoff valve.

SUMMARY

In one aspect according to the present invention, a fuel vapor processing apparatus is provided with a canister provided with an adsorbent material adsorbing fuel vapor produced in a fuel tank, and a shutoff valve disposed in a vapor passage connecting the canister and the fuel tank, wherein the shutoff valve is configured such that, when a stroke amount, that is an axial distance of a movable valve portion with respect to a valve seat, is within a predetermined range from zero, the shutoff valve is in a valve closing state and can maintain the fuel tank in a closed state, and such that a valve opening start position is learned based on the stroke amount at a time when an internal pressure of the fuel tank is decreased by a predetermined value or more as the stroke amount is varied in a valve opening direction; in leaning the valve opening start position of the shutoff valve, the stroke amount is varied in the valve opening direction by repeating a process of changing in the valve opening direction by a first predetermined stroke and maintaining for a first period of time, and subsequently changing in a valve closing direction by a second predetermined stroke smaller than the first predetermined stroke and maintaining for a second period of time longer than the first period of time, and the valve opening start position is determined based on the stroke amount in the state of maintaining for the second period of time in the process in which the internal pressure of the fuel tank is reduced by a predetermined value or more, or in its preceding process. Here, the preceding process may include not only the last process but also the process before that.

Therefore, in learning the valve opening start position, the process of the stroke amount is varied in the valve opening direction in a stepwise fashion by repeating the process of changing in the valve opening direction by the first predetermined stroke and maintaining for the first period of time, and subsequently changing in the valve closing direction by a stroke amount (the second predetermined stroke) smaller than the first predetermined stroke and maintaining for the second period of time longer than the first period of time. Therefore, when the shutoff valve is at the valve opening start position, it is returned in the closing direction from the state where the flow passage is relatively largely opened, so that the responsiveness to the variation of the internal pressure in the fuel tank can be improved, a time lag between the actual valve opening start time and the time when the valve opening start time is determined (the time when the reduction in the internal pressure of the fuel tank is detected) is reduced, whereby it is possible to improve the learning accuracy.

In another aspect of the present invention, in learning the valve opening start position of the shutoff valve, the stroke amount of the movable valve portion is changed to a valve closing position at a time when the reduction of the internal pressure of the fuel tank by the predetermined value or more is detected. Therefore, it is possible to prevent a gas within the fuel tank from flowing into the side of the canister by a large amount when the internal pressure of the fuel tank is high.

In another aspect of the present invention, a detection cyclic period for the internal pressure of the fuel tank is a period of time that is shorter than the first period of time. Therefore, the internal pressure of the fuel tank can be detected at a relatively short cyclic period, so that it is possible to minimize a difference between the actual internal pressure of the fuel tank and the detection value.

In another aspect of the present invention, in leaning the valve opening start position of the shutoff valve, a control of changing the stroke amount of the shutoff valve and a control of detecting the reduction of the internal pressure of the fuel tank by the predetermined value or more are executed independently of each other. Further, a control cyclic period of the control for detecting the reduction in the internal pressure of the fuel tank by the predetermined value or more is set to be smaller than a control cyclic period of the control for changing the stroke amount of the shutoff valve. Therefore, in comparison with a case where the control cyclic period of the control for detecting the reduction in the internal pressure of the fuel tank by the predetermined value or more is matched with the control for changing the stroke amount of the shutoff valve, the learning of the valve opening start position of the shutoff valve can be finished earlier.

In another aspect of the present invention, a provisional learning flag is turned on when a reduction of the internal pressure of the fuel tank by a value smaller than the predetermined value is detected, and if the internal pressure of the fuel tank is reduced by the predetermined value or more in a subsequent process in a state where the internal pressure of the fuel tank is continuously reduced, the valve opening start position is determined based on the stroke amount in the state of maintaining for the second period of time in a process in which the provisional flag is turned on or in its preceding process. Therefore, even in a case where the internal pressure of the fuel tank is low and the tank internal pressure gradually decreases after the start of opening of the shutoff valve, it is possible to accurately learn the valve opening start position of the shutoff valve.

In another aspect of the present invention, in a case that the valve opening start position is determined based on the stroke amount in the state of maintaining for the second period of time in a process in which the internal pressure of the fuel tank is reduced by the predetermined value or more or in a process in which the provisional flag is turned on, a value based on a difference between the first predetermined stroke and the second predetermined stroke is deducted from the stroke amount; and in a case that the valve opening start position is determined based on the stroke amount in the state of maintaining for the second period of time in a process immediately before a process in which the internal pressure of the fuel tank is reduced by the predetermined value or more or in a process immediately before a process in which the provisional flag is turned on, the value based on the difference between the first predetermined stroke and the second predetermined stroke is added to the stroke amount. Therefore, the learning accuracy of the valve opening start position of the shutoff valve can be improved.

DETAILED DESCRIPTION

Figure 1:
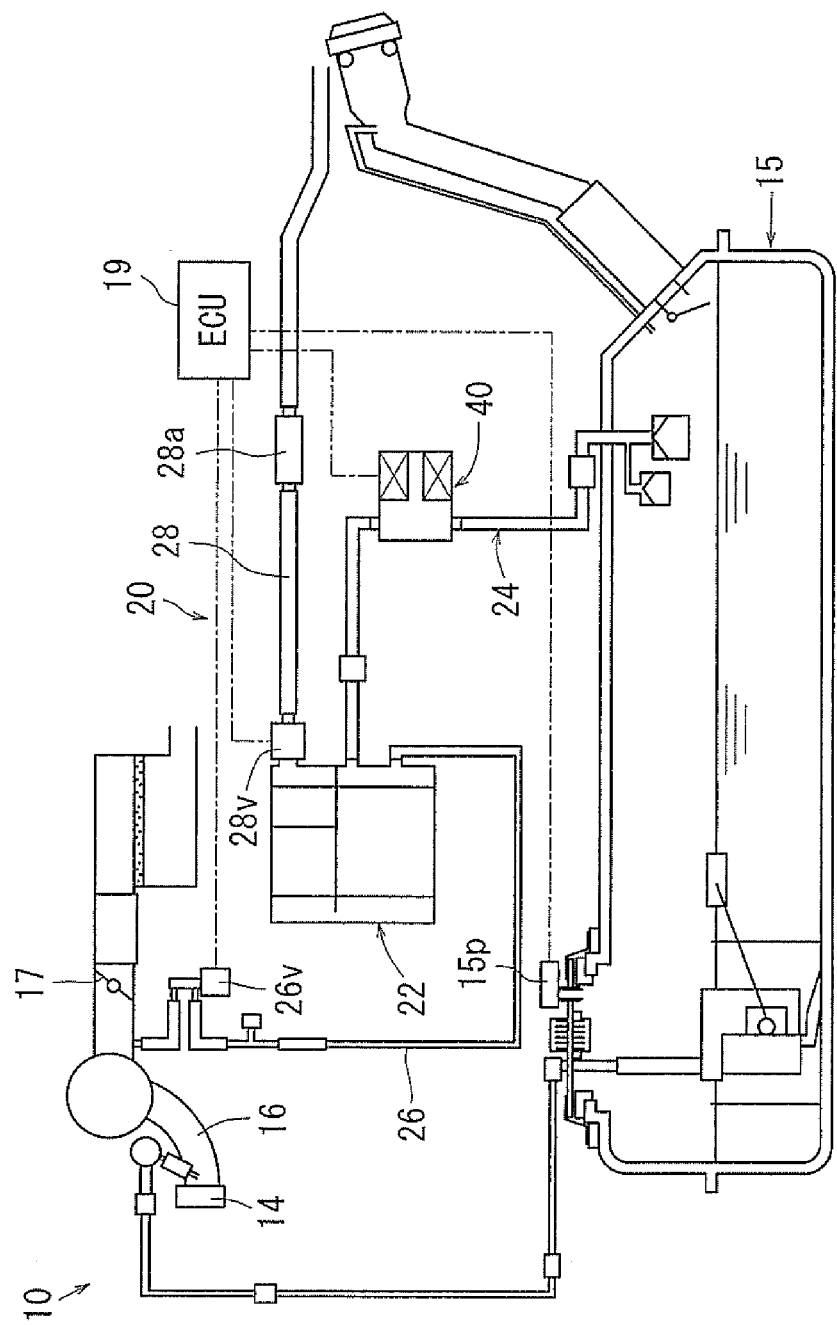
FIG. 1 is an overall structural view of a fuel vapor processing apparatus according to a first embodiment of the present invention.

In the following, a fuel vapor processing apparatus 20 according to a first embodiment of the present invention will be described with reference to FIGS. 1 through 14. As shown in FIG. 1, the fuel vapor processing apparatus 20 according to the present embodiment is provided in a vehicle engine system 10, and it is an apparatus for preventing leakage to the exterior of fuel vapor generated in a fuel tank 15 of the vehicle.

As shown in FIG. 1, the fuel vapor processing apparatus 20 is provided with a canister 22, a vapor passage 24 connected to the canister 22, a purge passage 26, and an atmosphere passage 28. The canister 22 is loaded with activated carbon (not shown) as an adsorbent material, and the fuel vapor in the fuel tank 15 can be adsorbed by the adsorbent material. One end portion (upstream side end portion) of the vapor passage 24 communicates with the gas layer portion in the fuel tank 15, and the other end portion (downstream side end portion) of the vapor passage 24 communicates with the interior of the canister 22. And, at some point of the vapor passage 24, there is provided a shutoff valve 40 (described below) allowing and interrupting communication through the vapor passage 24. Further, one end portion (upstream side end portion) of the purge passage 26 communicates with the interior of the canister 22, and the other end portion (downstream side end portion) of the purge passage 26 communicates with a portion of an intake passage 16 of an engine 14 on the downstream side of a throttle valve 17. And, at some point of the purge passage 26, there is provided a purge valve 26v allowing and interrupting communication through the purge passage 26.

Further, the canister 22 communicates with the atmosphere passage 28 via an on-board diagnostic (OBD) component 28v used for failure detection. At some point of the atmosphere passage 28, there is provided an air filter 28a, and the other end portion of the atmosphere passage 28 is open to the atmosphere. The shutoff valve 40, the purge valve 26v, and the OBD component 28v are controlled based on signals from an ECU 19. Further, the ECU 19 receives inputs of signals from a tank internal pressure sensor 15p for detecting the pressure inside the fuel tank 15, etc.

Next, the basic operation of the fuel vapor processing apparatus 20 will be described. While the vehicle is parking, the shutoff valve is maintained in the closed state. Thus, no fuel vapor in the fuel tank 15 flows into the canister 22. And, when a vehicle ignition switch is turned on during the parking, a learning control (described below) for learning a valve opening start position of the shutoff valve 40 is performed. Further, while the vehicle is parking, the purge valve 26v is maintained in the closed state, and the purge passage 26 is placed in the cutoff state, with the atmosphere passage 28 being maintained in the communication state. While the vehicle is traveling, the ECU 19 performs a control for purging the fuel vapor adsorbed by the canister 22 on the condition that a predetermined purge condition is satisfied. In this control, an opening/closing control is performed on the purge valve 26v, with the canister 22 communicating with the atmosphere via the atmosphere passage 28. When the purge valve 26v is opened, the intake negative pressure of the engine 14 is applied to the interior of the canister 22 via the purge passage 26. As a result, air begins to flow into the canister 22 via the atmosphere passage 28. Further, when the purge valve 26 is opened, the shutoff valve 40 moves in the opening direction to perform a pressure release control of the fuel tank 15. Due to this, the gas in the fuel tank 15 starts to flow into the canister 22 via the vapor passage 24. As a result, the adsorbent material in the canister 22 is purged by the air, etc. flowing into the canister 22, and the fuel vapor desorbed from the adsorbent material is introduced into the intake passage 16 of the engine 14 together with the air so as to be burned within the engine 14.

Figure 2:
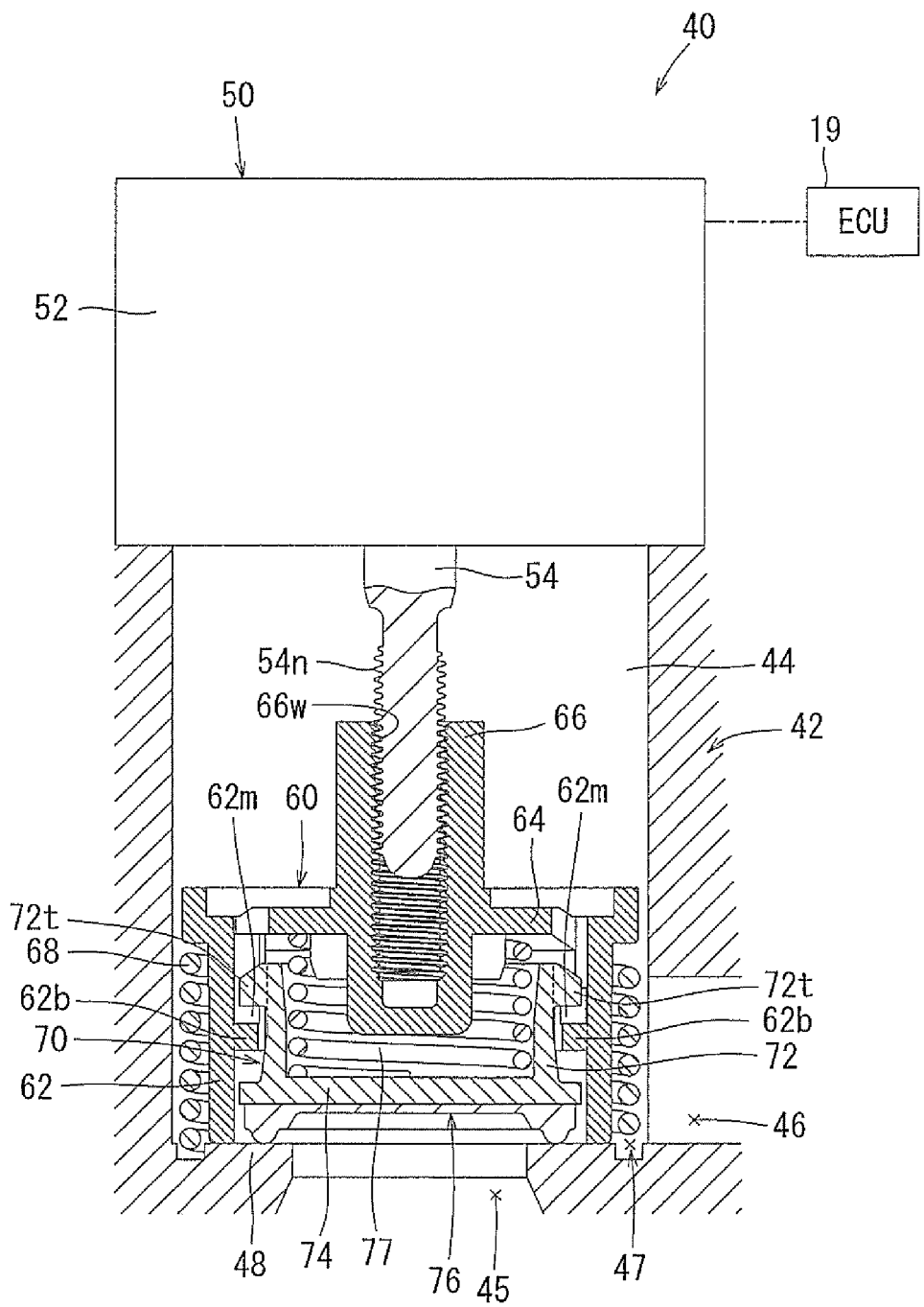
FIG. 2 is a vertical sectional view illustrating the initialization state of a shutoff valve used in the fuel vapor processing apparatus.

The shutoff valve 40 is a flow rate control valve which closes the vapor passage 24 in the closed state and which controls the flow rate of the gas flowing through the vapor passage 24 in the open state. As shown in FIG. 2, it is equipped with a valve casing 42, a stepping motor 50, a valve guide 60, and a valve member 70. In the valve casing 42, a continuous reverse-L-shaped fluid passage 47 is formed by a valve chamber 44, an inflow path 45, and an outflow path 46. Further, a valve seat 48 is concentrically formed on the lower surface of the valve chamber 44, that is, at the port edge portion of the upper end opening of the inflow path 45. The stepping motor 50 is located at the upper portion of the valve casing 42. The stepping motor 50 has a motor main body 52, and an output shaft 54 protruding from the lower surface of the motor main body 52 and configured to be capable of rotating in normal and reverse directions. The output shaft 54 is concentrically arranged within the valve chamber 44 of the valve casing 42, and a male thread portion 54n is formed on the outer peripheral surface of the output shaft 54.

The valve guide 60 is formed as a cylindrical tube with a top by a cylindrical tubular wall portion 62, and an upper wall portion 64 closing the upper end opening of the tubular wall portion 62. At the central portion of the upper wall portion 64, there is concentrically formed a tubular shaft portion 66, and a female thread portion 66w is formed on the inner peripheral surface of the tubular shaft portion 66. The valve guide 60 is arranged so as to be movable in the axial direction (vertical direction) in a state in which it is prevented from rotation about the axis relative to the valve casing 42 by a rotation preventing means (not shown). The male thread portion 54n of the output shaft 54 of the stepping motor 50 is threadedly engaged with the female thread portion 66w of the tubular shaft portion 66 of the valve guide 60, so that it is configured such that the valve guide 60 can ascend and descend in the vertical direction (axial direction) according to the normal and reverse rotations of the output shaft 54 of the stepping motor 50. Around the valve guide 60, there is provided an auxiliary spring 68 that urges the valve guide 60 upwards.

The valve member 70 is formed as a cylindrical tube with a bottom by a cylindrical tubular wall portion 72 and a lower wall portion 74 closing the lower end opening of the tubular wall portion 72. A seal member 76 consisting, for example, of a circular plate-shaped rubbery elastic member, is attached to the lower surface of the lower wall portion 74. The valve member 70 is concentrically arranged within the valve guide 60, and the seal member 76 of the valve member 70 is arranged so as to be capable of contacting the upper surface of the valve seat 48 of the valve casing 42. A plurality of connection protrusions 72t are formed in the circumferential direction on the outer peripheral surface of the upper end of the tubular wall portion 72 of the valve member 70. And, the connection protrusions 72t of the valve member 70 are fit-engaged with vertical-groove-like connection recesses 62m formed in the inner peripheral surface of the tubular wall portion 62 of the valve guide 60 so as to be capable of relative movement in the vertical direction by a fixed dimension. And, the valve guide 60 and the valve member 70 are movable together upwards (valve opening direction) in a state in which the bottom wall portions 62b of the connection recesses 62m of the valve guide 60 contact the connection protrusions 72t of the valve member 70 from below. Further, between the upper wall portion 64 of the valve guide 60 and the lower wall portion 74 of the valve member 70, there is concentrically provided a valve spring 77 normally urging the valve member 70 downwards, i.e., in the valve closing direction, relative to the valve guide 60.

Next, the basic operation of the shutoff valve 40 will be described. Based on an output signal from the ECU 19, the shutoff valve 40 causes the stepping motor 50 to rotate by a predetermined number of steps in the valve opening direction or the valve closing direction. And, as the stepping motor 50 is rotated by the predetermined number of steps, the valve guide 60 moves by a predetermined stroke amount in the vertical direction through the action of the threaded engagement between the male thread portion 54n of the output shaft 54 of the stepping motor 50 and the female thread portion 66w of the tubular shaft portion 66 of the valve guide 60. With the shutoff valve 40, for example, setting is made such that the number of steps is approximately 200 steps and that the stroke amount is approximately 5 mm at the fully open position.

As shown in FIG. 2, in the initialized state (initial state) of the shutoff valve 40, the valve guide 60 is maintained at the lower limit position, and the lower end surface of the tubular wall portion 62 of the valve guide 60 is in contact with the upper surface of the valve seat 48 of the valve casing 42. In this state, the connection protrusions 72t of the valve member 70 are situated on the upper side of the bottom wall portions 62b of the connection recesses 62m of the valve guide 60, and the seal member 76 of the valve member 70 is pressed against the upper surface of the valve seat 48 of the valve casing 42 by the spring force of the valve spring 77. That is, the shutoff valve 40 is maintained in the fully closed state. And, the number of steps of the stepping motor 50 at this stage is 0, and the axial (upward) movement amount of the valve guide 60, i.e., the stroke amount in the valve opening direction, is 0 mm.

While the vehicle is, for example, parking, the stepping motor 50 of the shutoff valve 40 is rotated by, for example, 4 steps, in the valve opening direction from the initialized state. As a result, due to the action of the treaded engagement between the male thread portion 54n of the output shaft 54 of the stepping motor 50 and the female thread portion 66w of the tubular shaft portion 66 of the valve guide 60, the valve guide 60 is moved upwards by approximately 0.1 mm, and is maintained in a state in which it is raised from the valve seat 48 of the valve casing 42. As a result, an excessive force may be hardly applied between the valve guide 60 of the shutoff valve 40 and the valve seat 48 of the valve casing 42 with a change in environmental factors such as temperature. In this state, due to the spring force of the valve spring 77, the seal member 76 of the valve member 70 is pressed against the upper surface of the valve seat 48 of the valve casing 42.

Figure 3:
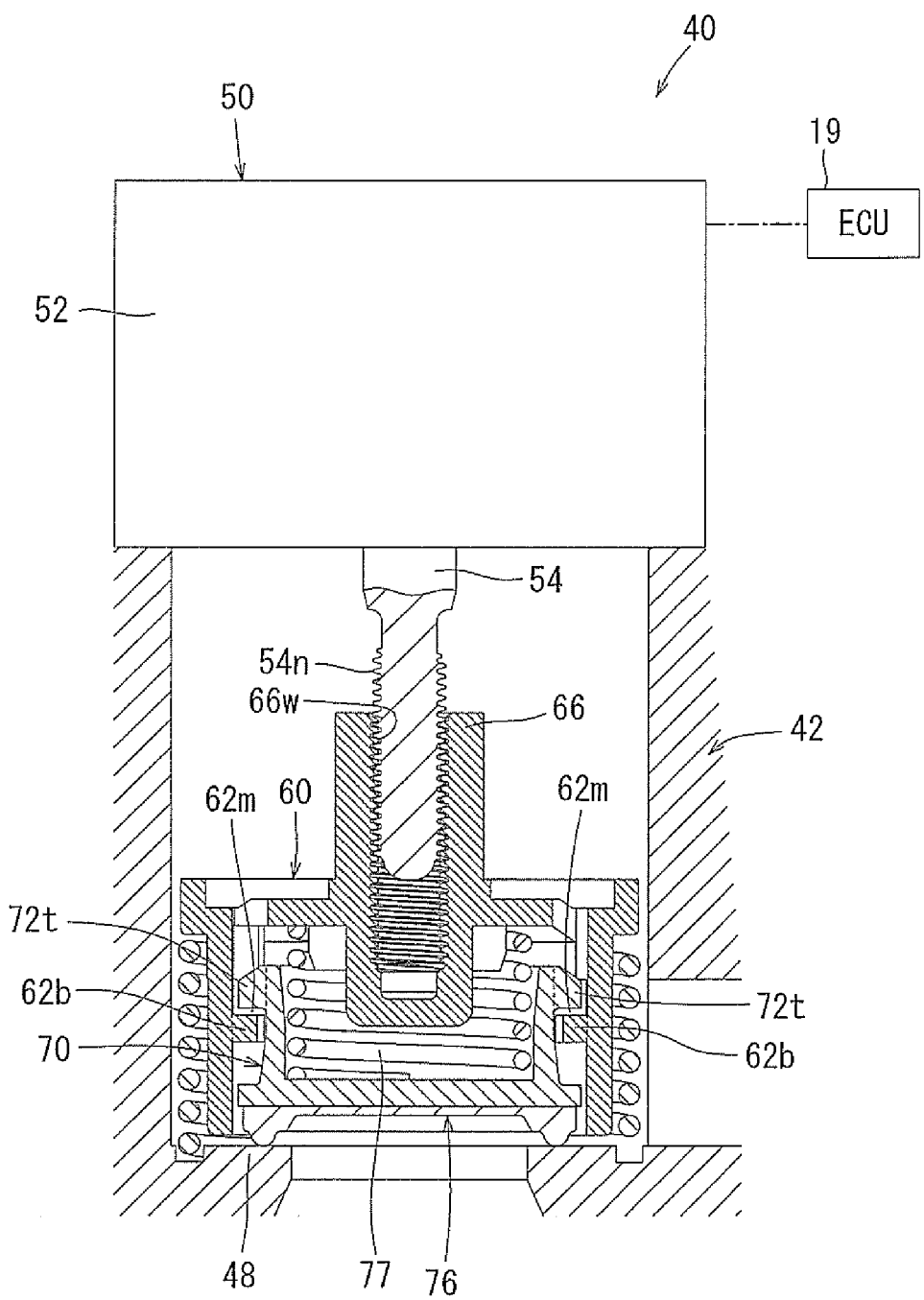
FIG. 3 is a vertical sectional view illustrating the closed state of the shutoff valve.
Figure 4:
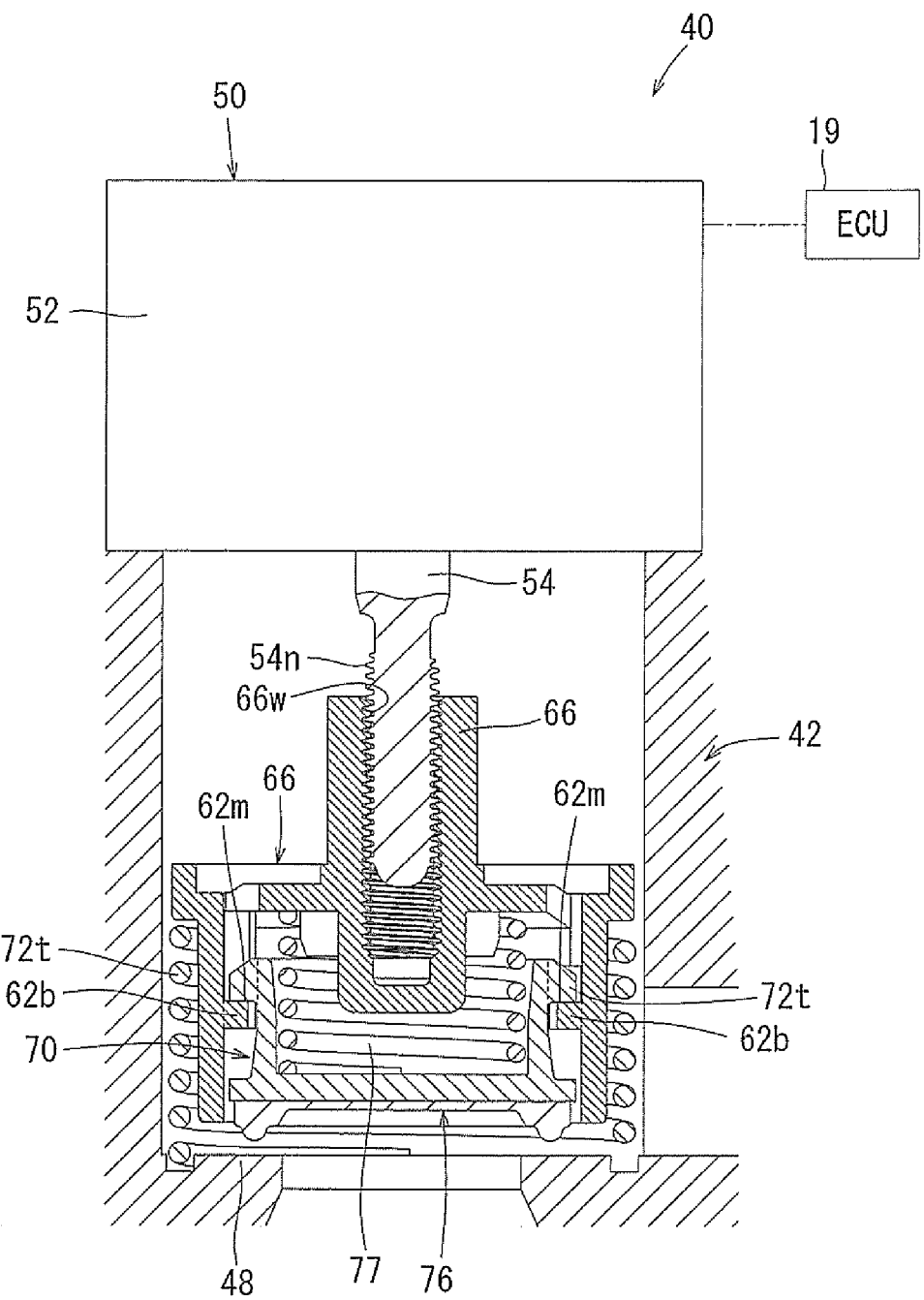
FIG. 4 is a vertical sectional view illustrating the open state of the shutoff valve.

When the stepping motor 50 further rotates in the valve opening direction from the position where it has rotated by 4 steps, the valve guide 60 moves upwards due to the action of the threaded engagement between the male thread portion 54n and the female thread portion 66w, and, as shown in FIG. 3, the bottom wall portions 62b of the connection recesses 62m of the valve guide 60 contact the connection protrusions 72t of the valve member 70 from below. And, as the valve guide 60 moves further upwards, the valve member 70 moves upwards together with the valve guide 60 as shown in FIG. 4, and the seal member 76 of the valve member 70 is separated from the valve seat 48 of the valve casing 42. As a result, the shutoff valve 40 is opened.

Here, due to the positional tolerance of the connection protrusions 72t formed on the valve member 70, the positional tolerance of the bottom wall portions 62b formed in connection recesses 62m of the valve guide 60, etc., the valve opening start position of the shutoff valve 40 is different for each shutoff valve 40, so that it is necessary to accurately learn the valve opening start position. This learning is performed by a learning control, in which the number of steps of the valve opening start position is detected based on the time when the internal pressure of the fuel tank 15 is decreased by a predetermined value or more while the stepping motor 50 of the shutoff valve 40 is rotated in the valve opening direction (i.e., the number of steps is increased). In this way, when the shutoff valve 40 is in the closed state, the valve guide 60 corresponds to the movable valve portion of the present invention, and when the shutoff valve 40 is in the open state, the valve guide 60 and the valve member 70 correspond to the movable valve portion of the present invention.

Next, the learning control of the valve opening start position of the shutoff valve 40 will be described with reference to FIGS. 5 through 7. The learning control is performed at the time when the ignition switch of the engine is turned on while the vehicle is parking. Here, in the upper part of FIG. 5, the change in the number of steps of the stepping motor 50, that is, the stroke amount (axial movement amount) of the valve guide 60 and of the valve member 70, is indicated, using time as the reference (horizontal axis). Thus, from here onward, the terms of "the number of steps" and "the stroke amount" will be used as synonyms. In the lower part of FIG. 5, the change in the internal pressure of the fuel tank 15 (tank internal pressure) is indicated, using time as the reference (horizontal axis). Here, the tank internal pressure is detected for each fixed cyclic period ($\Delta Ts$).

As described above, while the vehicle is parking, as a result of rotation of the stepping motor 50 by, for example, 4 steps in the valve opening direction, the valve guide 60 is maintained in the state in which it is raised by approximately 0.1 mm from the valve seat 48 of the valve casing 42. When, in this state, the ignition switch of the engine is turned on, the stepping motor 50 is rotated by 4 steps (−4 steps) in the valve closing direction, so that the shutoff valve 40 is restored to the initialized state (0 step). Next, as shown in the upper portion of FIG. 5, the stepping motor 50 is rotated at a high speed in the valve opening direction to a valve closing limit position SO steps on the design of the shutoff valve 40. As a result, the valve guide 60 moves relatively quickly upwards to the valve closing limit position, making it possible to shorten the learning time. At that time, the seal member 76 of the valve member 70 is held in contact with the upper surface of the valve seat 48 of the valve casing 42 by the spring force of the valve spring 77, and the shutoff valve 40 is in the closed state.

Figure 5:
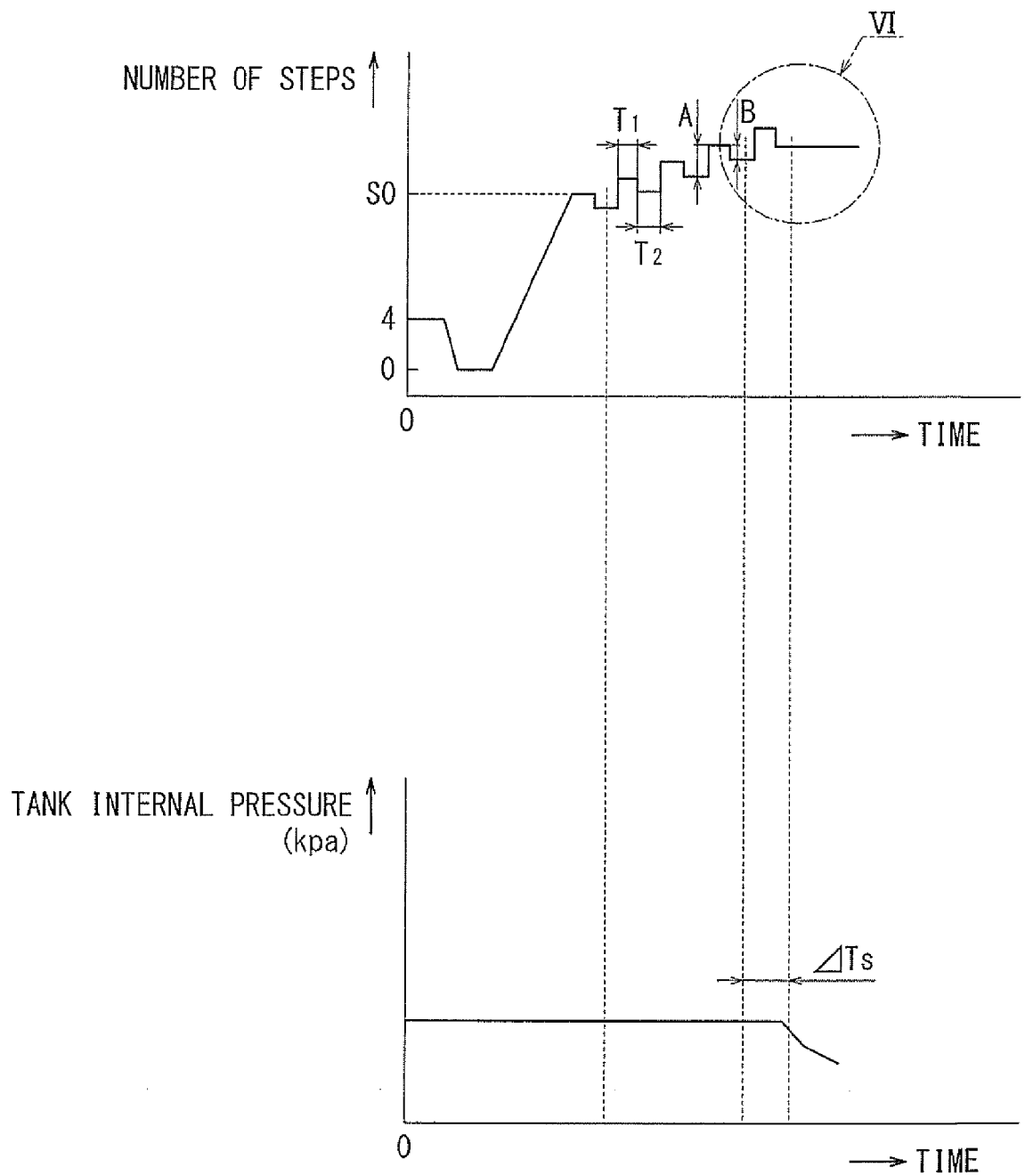
FIG. 5 is a graph illustrating a learning control in which the valve opening start position of the shutoff valve is learned.

After the stepping motor 50 rotates in the valve opening direction by SO step, i.e., to the valve closing limit position of the shutoff valve 40, the stepping motor 50 stops and this state is maintained for a fixed period of time $T_1$ (e.g., 500 milliseconds) (see the upper part of FIG. 5). Next, the stepping motor 50 rotates in the valve closing direction by B steps (e.g., −2 steps), and this state is maintained for a fixed period of time $T_2$ (e.g., 1 sec). And, the tank internal pressure is detected at a predetermined time while the stepping motor 50 is maintained in the above state for the fixed period of time $T_2$. If the tank internal pressure detected at that time is not reduced by a predetermined value ($\Delta P1$) or more with respect to the detection value at the last time, the value obtained by subtracting B steps (B=2) from the valve closing limit position SO steps, that is, (SO−2), is stored as the stroke amount.

Figure 6:
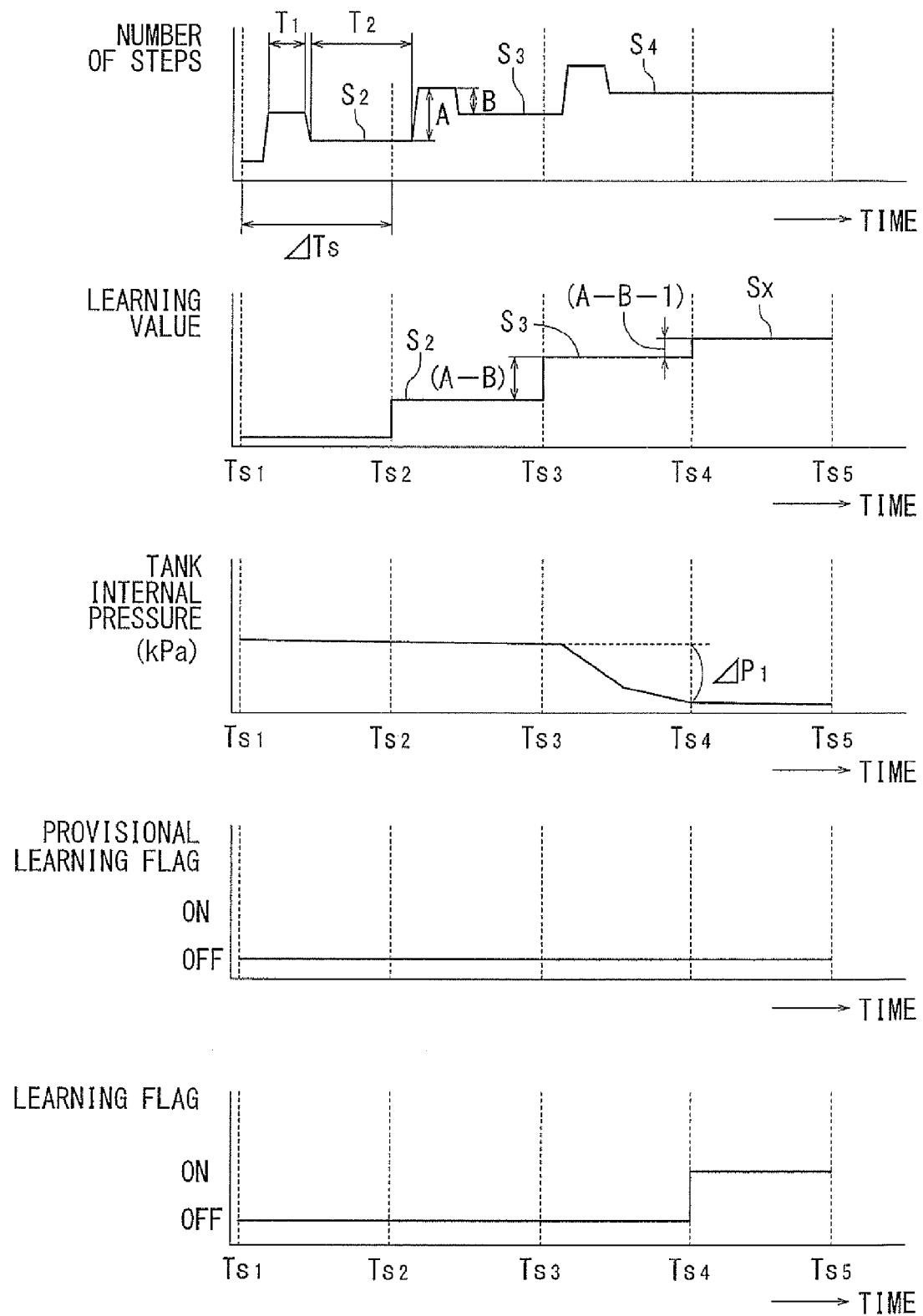
FIG. 6 is a graph I illustrating the learning control in a portion indicated by arrow VI in FIG. 5.
Figure 7:
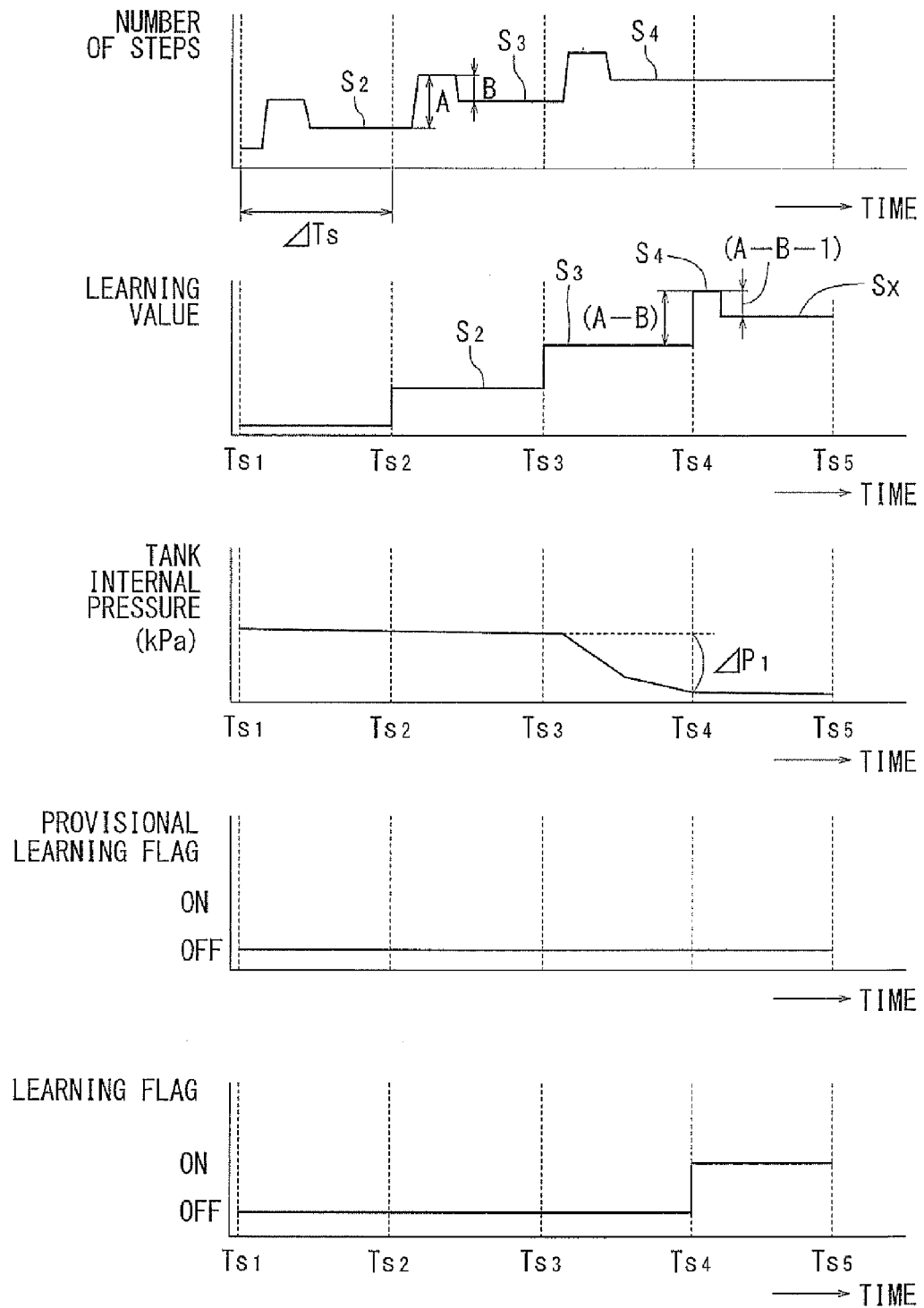
FIG. 7 is a graph II illustrating the learning control in a portion indicated by arrow VI in FIG. 5.
Figure 8:
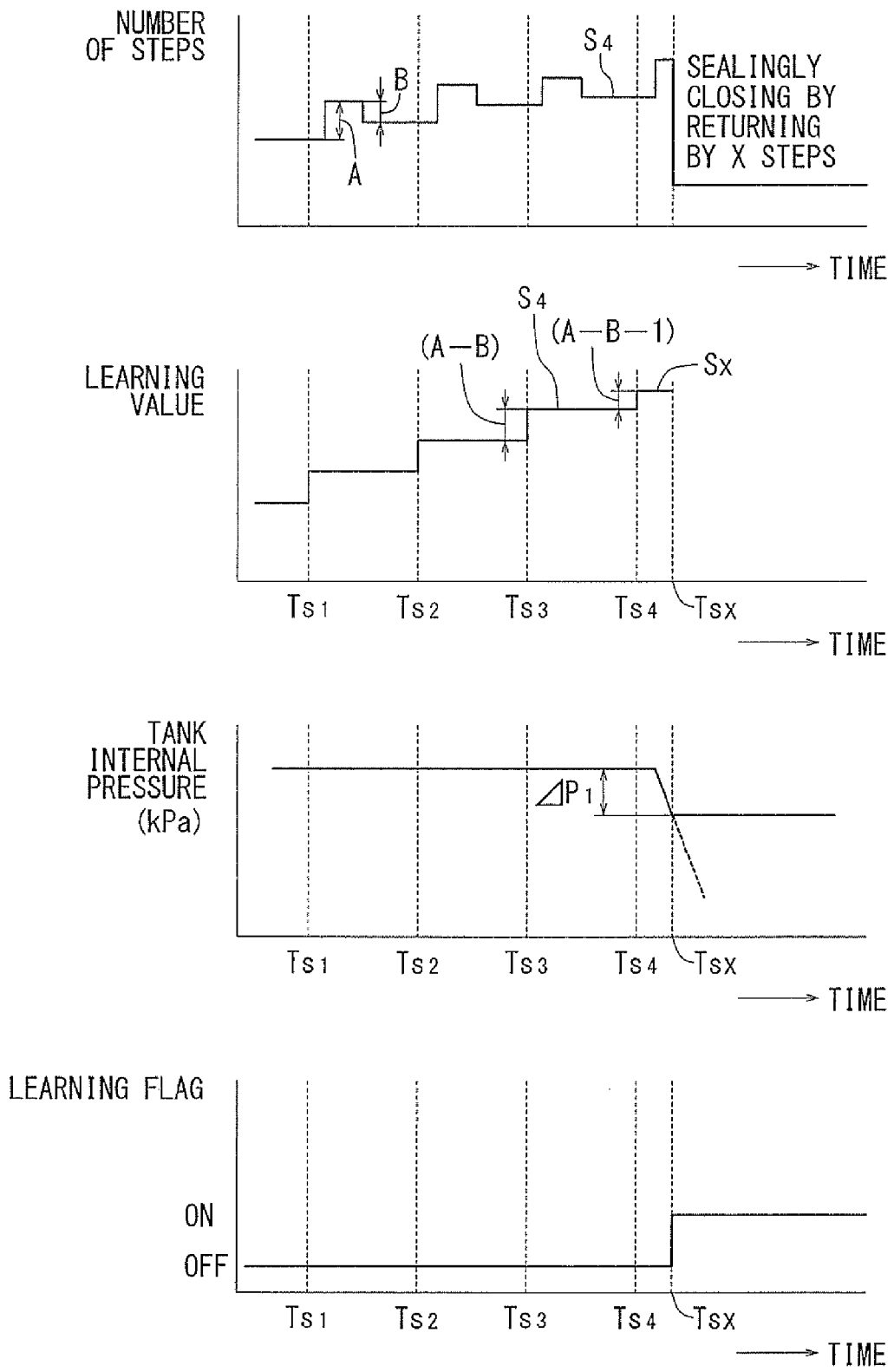
FIG. 8 is a graph illustrating a learning control according to a modification.

Next, as shown in the upper part of FIG. 6, the stepping motor 50 is rotated in the valve opening direction by A steps (e.g., 4 steps), and is maintained for a fixed period of time $T_1$ (e.g., 500 milliseconds); after that, the stepping motor 50 is rotated in the valve closing direction by B steps (e.g., −2 steps), and is maintained in this state for a fixed period of time $T_2$ (e.g., 1 sec). And, the tank internal pressure is detected at a predetermined time while the stepping motor 50 is maintained in this state for the fixed period of time $T_2$. At that time, when the tank internal pressure has not been reduced by the predetermined value ($\Delta P_1$) or more as compared with the stroke amount (SO−2) at the last time, the value obtained by adding to the stroke amount (S0−2) steps at the last time the difference between the stroke amount A in the valve opening direction and the stroke amount B in the valve closing direction at this time, (A−B=2) steps, is used as a new stroke amount. That is, the stroke amount is updated from (SO−2) steps to SO steps. Here, the detection cyclic period for the tank internal pressure ($\Delta Ts$) is set to be equal to the learning cyclic period in which the stepping motor 50 rotates in the valve opening direction and is maintained in this state for the fixed period of time $T_1$ and the stepping motor 50 rotates in the valve closing direction and is maintained in this state for a fixed period of time $T_2$.

And, this process is repeatedly executed, and, as indicated by a graph of the tank internal pressure in FIG. 6, when the tank internal pressure detected at this time is reduced by the predetermined value ($\Delta P_1$) or more (see time $T_{S4}$), as compared with the detection value at the last time (see time $T_{S3}$), it is determined that the opening of the shutoff valve 40 has been started. As a result, as shown in the lower part of FIG. 6, a learning flag is turned on at time $T_{S4}$. As a result, as shown in a graph of the learning value of FIG. 6, the value obtained by adding (A−B−1=1) step to a stroke amount $S_3$ updated in the last process (see time $T_{S3}$) is stored as a learning value Sx of the valve opening start position, and the learning control is completed. Here, the predetermined value ($\Delta P_1$), which is the amount of change of the tank internal pressure used for the judgment of the valve opening start position of the shutoff valve 40, is set, for example, to a value of approximately 0.3 kPa, taking into consideration of variations in the characteristics of the tank internal pressure sensor 15$p$ and surface shaking of the fuel tank 15 due to the traveling of the vehicle, etc.

In the above example, when the learning flag is turned on, (A−B−1=1) step is added to the stroke amount $S_3$ updated in the last process (see timing $T_{S3}$), and the value thus obtained is used as the learning value Sx. It is, however, also possible, as shown in a graph of the learning value in FIG. 7, to update the stroke amount from $S_3$ steps to $S_4$ steps in the process in which the learning flag is turned on (see timing $T_{S4}$), and to store the value obtained by subtracting (A−B−1=1) step from the updated stroke amount $S_4$ as the learning value Sx. As described above, the state in which the stepping motor 50 is rotated in the valve opening direction by A steps (e.g., 4 steps) corresponds to the state in which the movable valve portion of the present invention is changed in the valve opening direction by a first predetermined stroke, and the state in which the stepping motor 50 is rotated in the valve closing direction by B steps (e.g., 2 steps) corresponds to the state in which the movable valve portion of the present invention is changed in the valve closing direction by a second predetermined stroke. The fixed period of time $T_1$ (e.g., 500 milliseconds) corresponds to a first time of the present invention, and the fixed period of time $T_2$ (e.g., 1 sec) corresponds to a second time of the present invention.

According to the fuel vapor processing apparatus 20 of the present embodiment, in learning the valve opening start position for the shutoff valve 40, the stepping motor 50 is rotated in the valve opening direction by A steps (e.g., 4 steps) and is maintained in this state for the fixed period of time $T_1$ (e.g., 500 milliseconds); further, the stepping motor 50 is rotated in the valve closing direction by B steps (e.g., 2 steps) and is maintained in this state for the fixed period of time $T_2$ (e.g., 1 sec); this process is repeatedly performed to change stepwise the stroke amount of the valve guide 60 and the valve member 70 (the movable valve portions) in the valve opening direction. That is, at the valve opening start position for the shutoff valve 40, the flow passage is restored in the closing direction from the state in which it is open to a relatively large degree, so that the responsiveness of the change in the internal pressure of the fuel tank 15 is improved, and the deviation in time between the actual valve opening start time and the valve opening start judgment time (the time when the reduction in the internal pressure of the fuel tank 15 is detected) is reduced, so that it is possible to achieve an improvement in terms of learning accuracy.

The present invention is not limited to the above-described embodiment but allows modification within a scope that does not depart from the gist of the present invention. For example, while in the above-described embodiment the internal pressure of the fuel tank 15 (tank internal pressure) is detected for each fixed cyclic period ($\Delta T_S$) in conformity with the learning cyclic period, it is also possible to constantly detect the tank internal pressure. By doing so, as shown, for example, in a graph of the tank internal pressure in FIG. 8, it is possible to turn on the learning flag independently of the learning cyclic period at the time when it is detected that the tank internal pressure has been reduced by a predetermined value ($\Delta P_1$) or more, whereby a learning value Sx (=S4+A−B−1) is updated. Further, after the learning value has been updated, it is preferable to restore the valve guide 60 and the valve member 70 to the valve closing position by rotating the stepping motor 50 of the shutoff valve 40 in the valve closing direction by X steps. By doing so, even when the internal pressure of the fuel tank 15 is high, it is possible to prevent a large amount of gas in the fuel tank 15 from flowing to the side of the canister 22.

Further, in the present embodiment, only when the internal pressure of the fuel tank 15 (tank internal pressure) has been reduced by the predetermined value ($\Delta P_1$) or more with respect to the detection value at the last time, it is determined that the opening of the shutoff valve 40 has been started. If, however, the tank internal pressure is low, there may be a case in which even when the opening of the shutoff valve 40 is started, the tank internal pressure is not reduced by a predetermined amount ($\Delta P_1$) or more. In order to make it possible to perform the learning control accurately even in such a case, a provisional learning flag is turned on as shown in FIG. 9, whereby the updating of the stroke amount is suspended.

Figure 9:
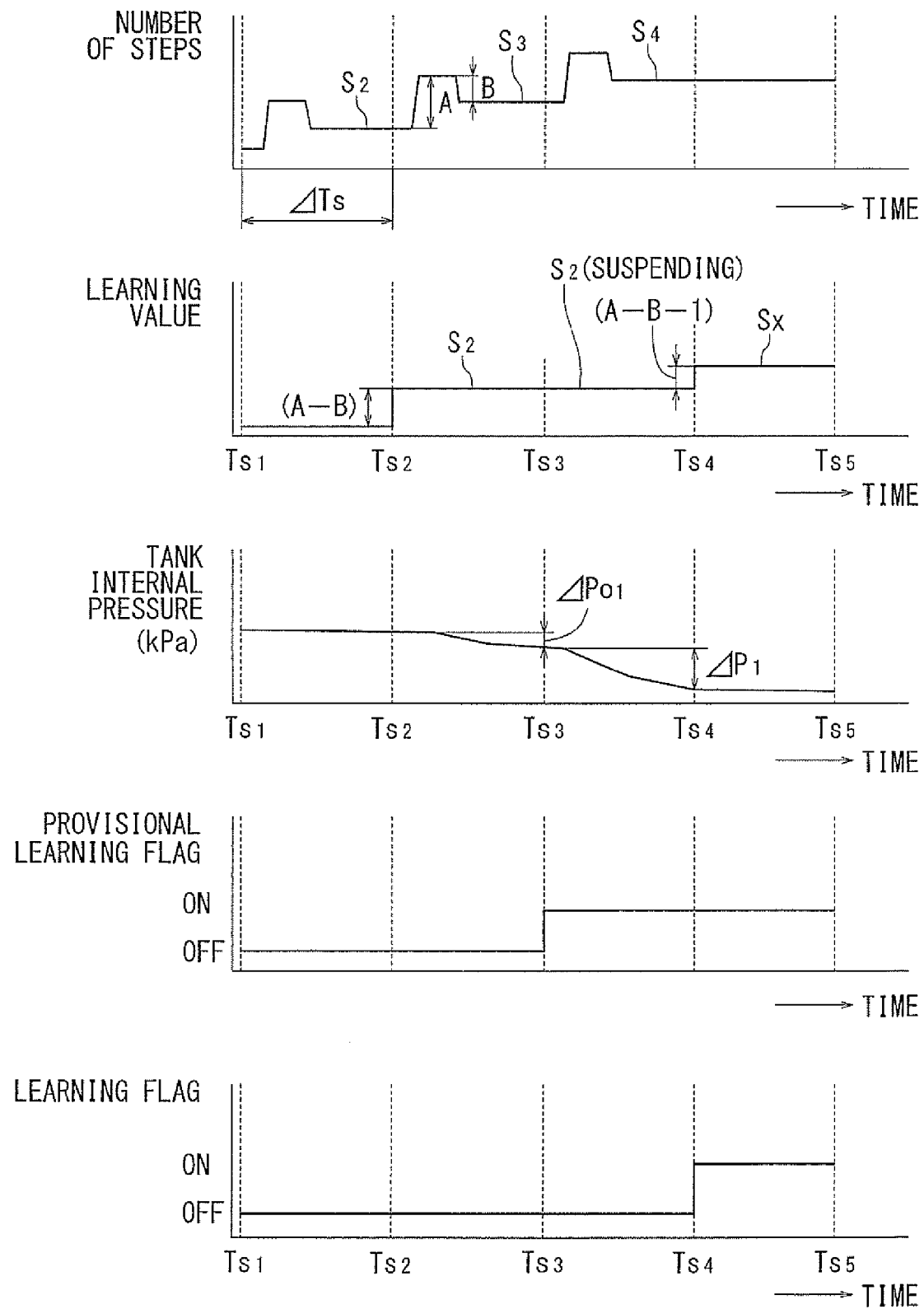
FIG. 9 is a graph illustrating a learning control according to a modification.

That is, in the method as shown in FIG. 9, the internal pressure of the fuel tank 15 (tank internal pressure) is detected for each fixed cyclic period ($\Delta Ts$), and, if the tank internal pressure is reduced to a level below a first reference value ($\Delta P_{01}$) which is smaller than the predetermined value ($\Delta P_1$), it is determined that there is a possibility that the valve opening start of the shutoff valve 40 has started, and the provisional learning flag is turned on. For example, in the case that the stepping motor 50 rotates by B steps (e.g., −2 steps) in the valve closing direction and is maintained in this state for a fixed period of time $T_2$ (e.g., 1 sec), if it is detected during this period that the tank internal pressure is reduced from a detection value (time $T_{S2}$) at the last time by the first reference value ($\Delta P_{01}$) (see time $T_{S3}$), the provisional learning flag is turned on at time $T_{S3}$.

At that time, as shown in the upper part of FIG. 9, the number of steps of the stepping motor 50 is $S_3$ steps; however, due to the turning on of the provisional learning flag, the updating the stroke amount is prohibited. That is, a stroke amount ($S_2$ steps) updated in the last process is suspended. Next, the stepping motor 50 is rotated in the valve opening direction by A steps (e.g., 4 steps) and is maintained in this state for a fixed period of time $T_1$ (e.g., 500 milliseconds), and after that, the stepping motor 50 is rotated in the valve closing direction by B steps (e.g., −2 steps) and is maintained in this state for a fixed period of time $T_2$ (e.g., 1 sec). And, the tank internal pressure is detected at time $T_{S4}$ during maintaining of the stepping motor 50 for the fixed period of time $T_2$. Then, if the tank internal pressure detected at this time is reduced from the detection value at the last time (see time $T_{S3}$) by the predetermined value ($\Delta P_1$) or more (see time $T_{S4}$), the learning flag is turned on at time $T_{S4}$. As a result, a value obtained by adding (A−B−1=1) step to the suspended stroke amount (S2 steps) is stored as the learning value Sx, and the learning control is completed. That is, even when the tank internal pressure is low, it is possible to accurately perform the learning control.

Figure 10:
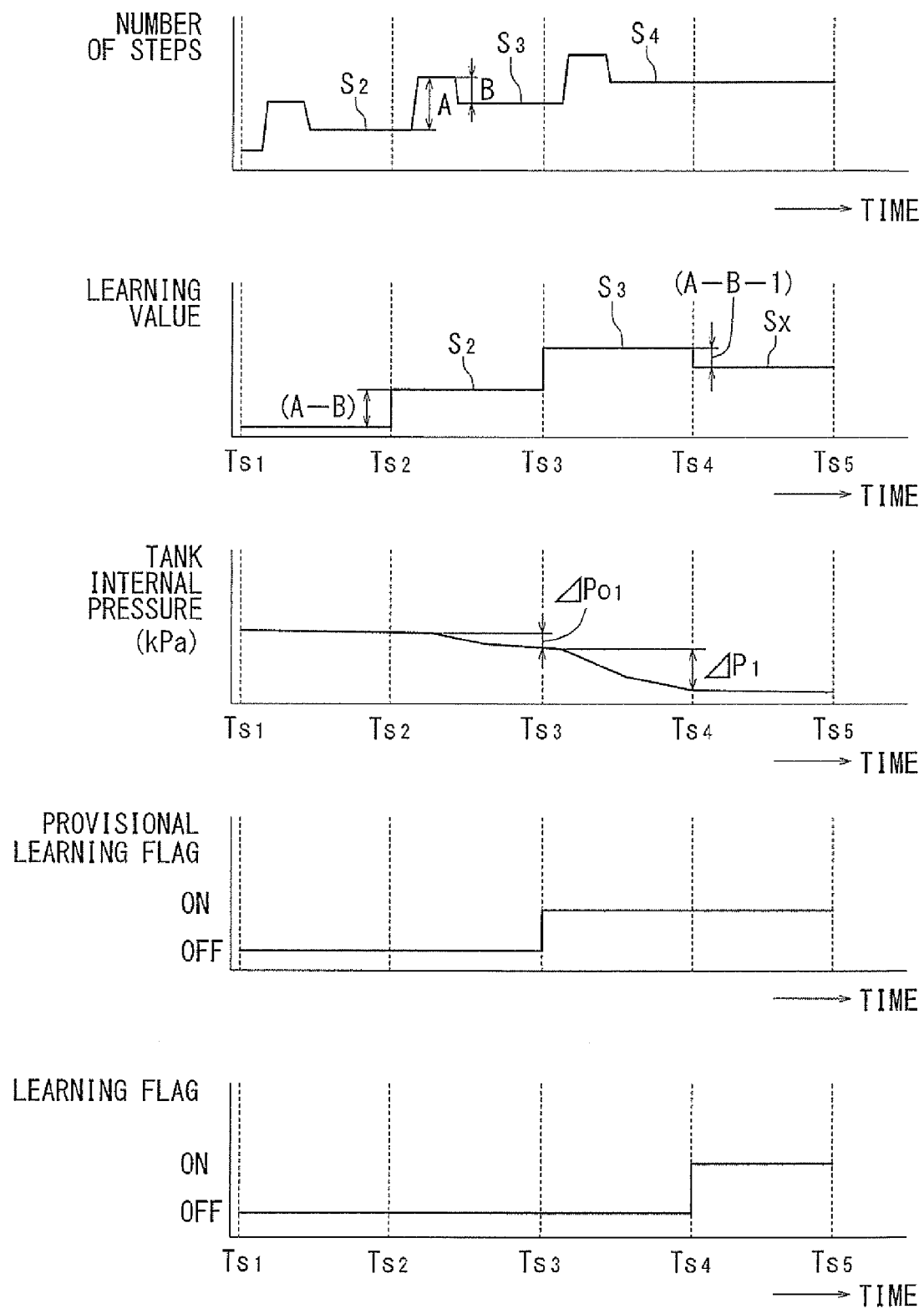
FIG. 10 is a graph illustrating a learning control according to a modification.

Here, while in the example shown in FIG. 9 the updating of the stroke amount is prohibited when the provisional learning flag is turned on, it is also possible, as shown in FIG. 10, to update the stroke amount from $S_2$ steps to $S_3$ steps even when the provisional learning flag is turned on at time $T_{S3}$, and to subtract (A−B−1=1) from the updated stroke amount ($S_3$ steps) when the learning flag is turned on in the next process (see time $T_{S4}$).

Figure 11:
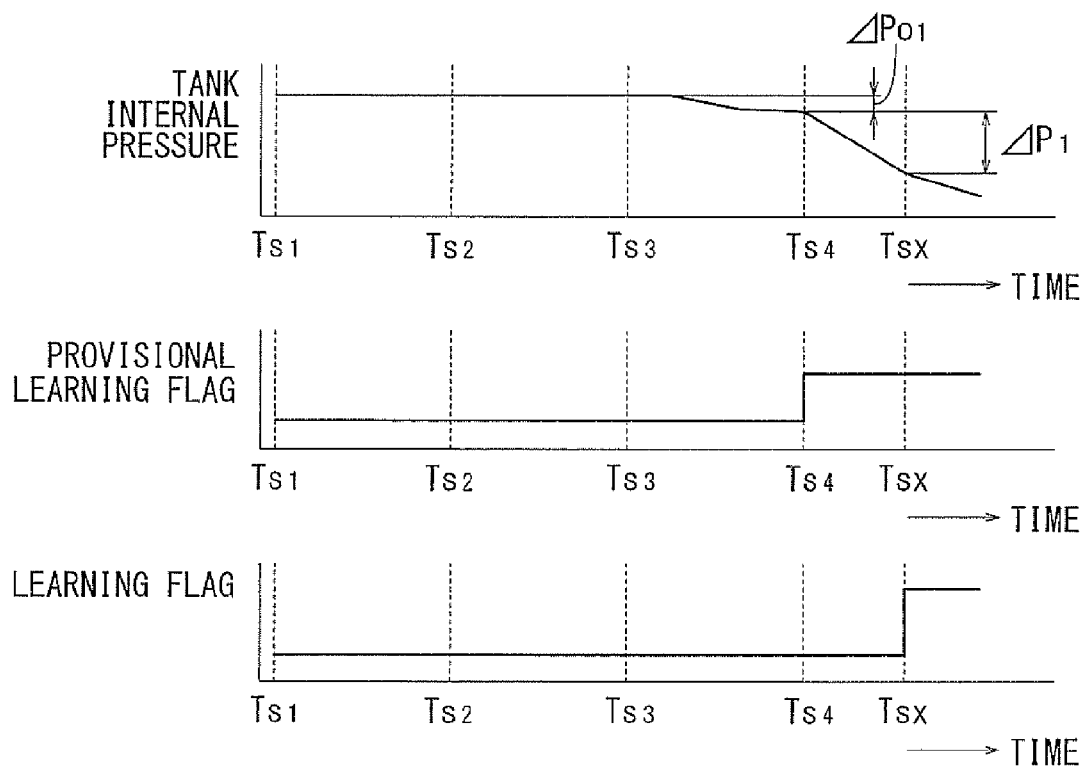
FIG. 11 is a graph illustrating the relationship between a tank internal pressure and a learning flag according to a modification.
Figure 12:
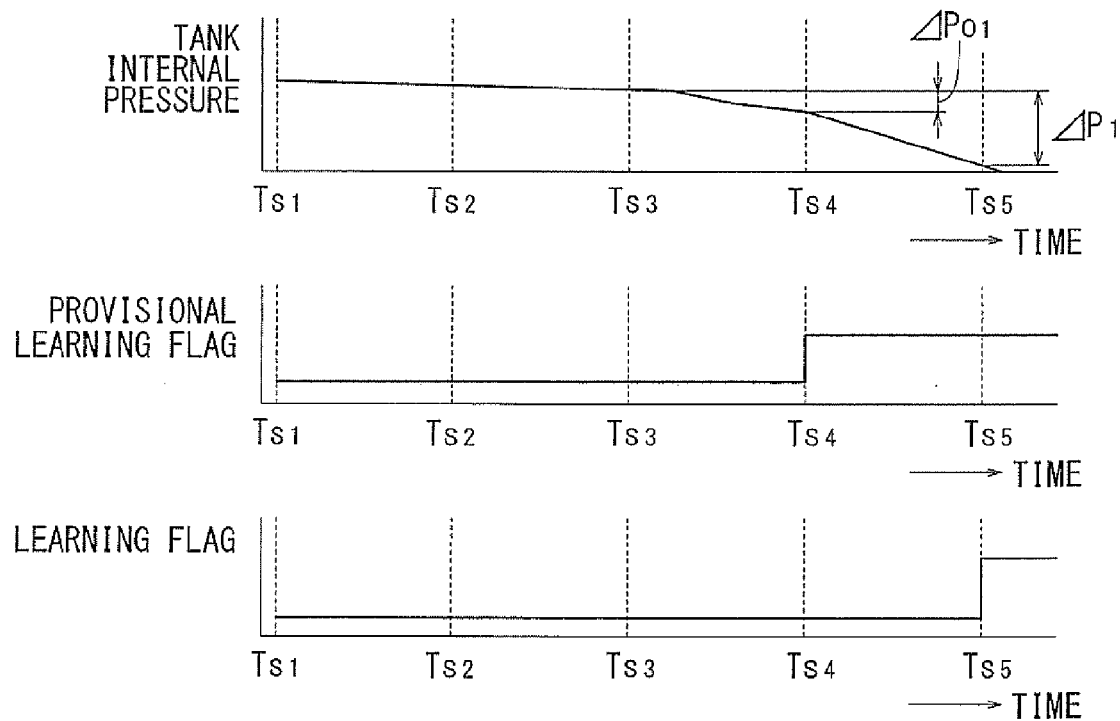
FIG. 12 is a graph illustrating the relationship between a tank internal pressure and a learning flag according to a modification.
Figure 13:
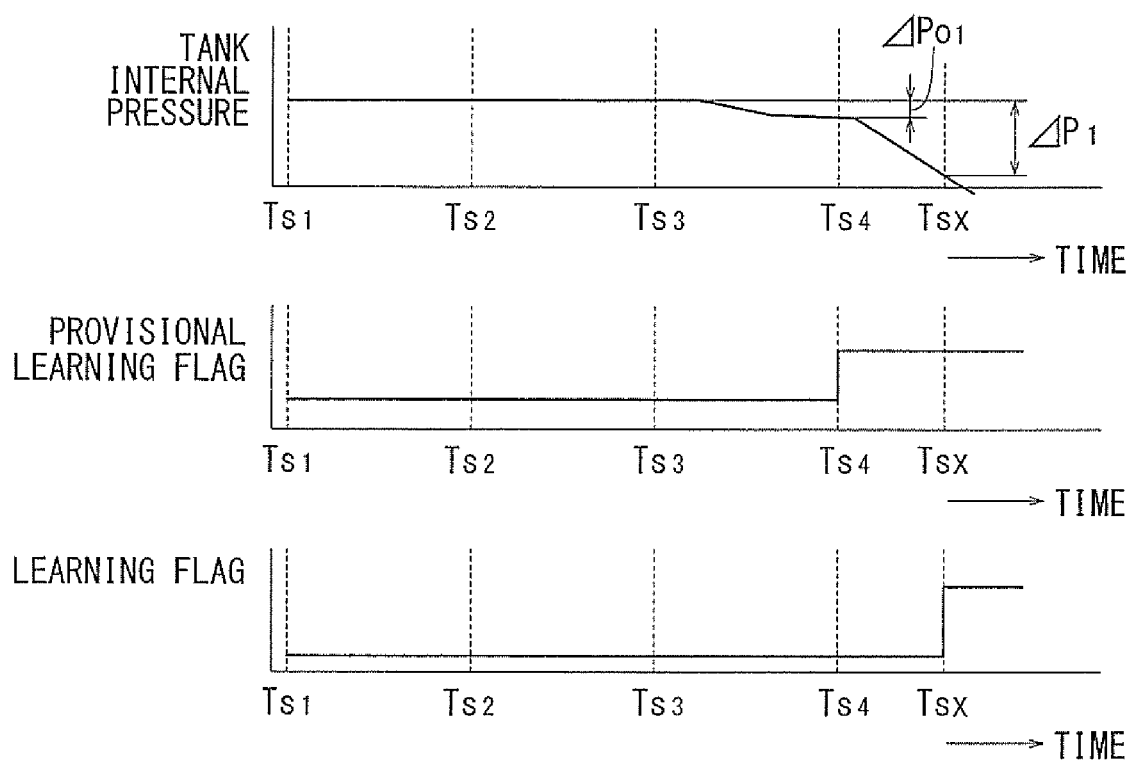
FIG. 13 is a graph illustrating the relationship between a tank internal pressure and a learning flag according to a modification.

Here, in the examples shown in FIGS. 9 and 10, the internal pressure of the fuel tank 15 (tank internal pressure) is detected for each fixed cyclic period ($\Delta Ts$). However, as shown in FIG. 11, it is also possible to constantly detect the tank internal pressure, and to turn on the learning flag at the time (see time Tsx) when the tank internal pressure is reduced by the predetermined value ($\Delta P_1$) or more with respect to the detection value at the last time (see time $T_{S4}$). Further, in the examples shown in FIGS. 9 and 10, the provisional learning flag is turned on at the time (see time $T_{S3}$) when the tank internal pressure is reduced by the first reference value ($\Delta P_{01}$) or more within the fixed cyclic period ($\Delta Ts$), and the learning flag is turned on at the time (see time $T_{S4}$) when the tank internal pressure is reduced by the predetermined value ($\Delta P_1$) or more within the fixed cyclic period ($\Delta Ts$). However, as shown in FIG. 12, it is also possible to turn on the provisional learning flag at the time (see time $T_{S4}$) when the tank internal pressure is reduced by the first reference value ($\Delta P_{01}$) or more within the fixed cyclic period ($\Delta Ts$), and to turn on the learning flag if the addition value obtained by adding the value by which the tank internal pressure is reduced in the next process (within the fixed cyclic period ($\Delta Ts$)) to the value by which the tank internal pressure is reduced in the last process, that is, if the reduction amount accumulation value of the tank internal pressure is the predetermined value ($\Delta P_1$) or more. Further, as shown in FIG. 13, it is also possible to make it possible to constantly detect the tank internal pressure, and to turn on the learning flag at the time (see time Tsx) when the reduction amount accumulation value of the tank internal pressure is the predetermined value ($\Delta P_1$) or more.

If the tank internal pressure is low, there may be a case in which the tank internal pressure is gently reduced even after the opening of the shutoff valve 40 has been started, resulting in that it takes time for the tank internal pressure to be reduced by the predetermined value ($\Delta P_1$) or more. In order that the learning control may be performed accurately also in this case, as shown in FIG. 14, the tank internal pressure reduction state is monitored after turning-on of the provisional learning flag, and, when the reduction amount accumulation value of the tank internal pressure has become the predetermined value ($\Delta P_1$) or more, the learning flag is turned on.

Figure 14:
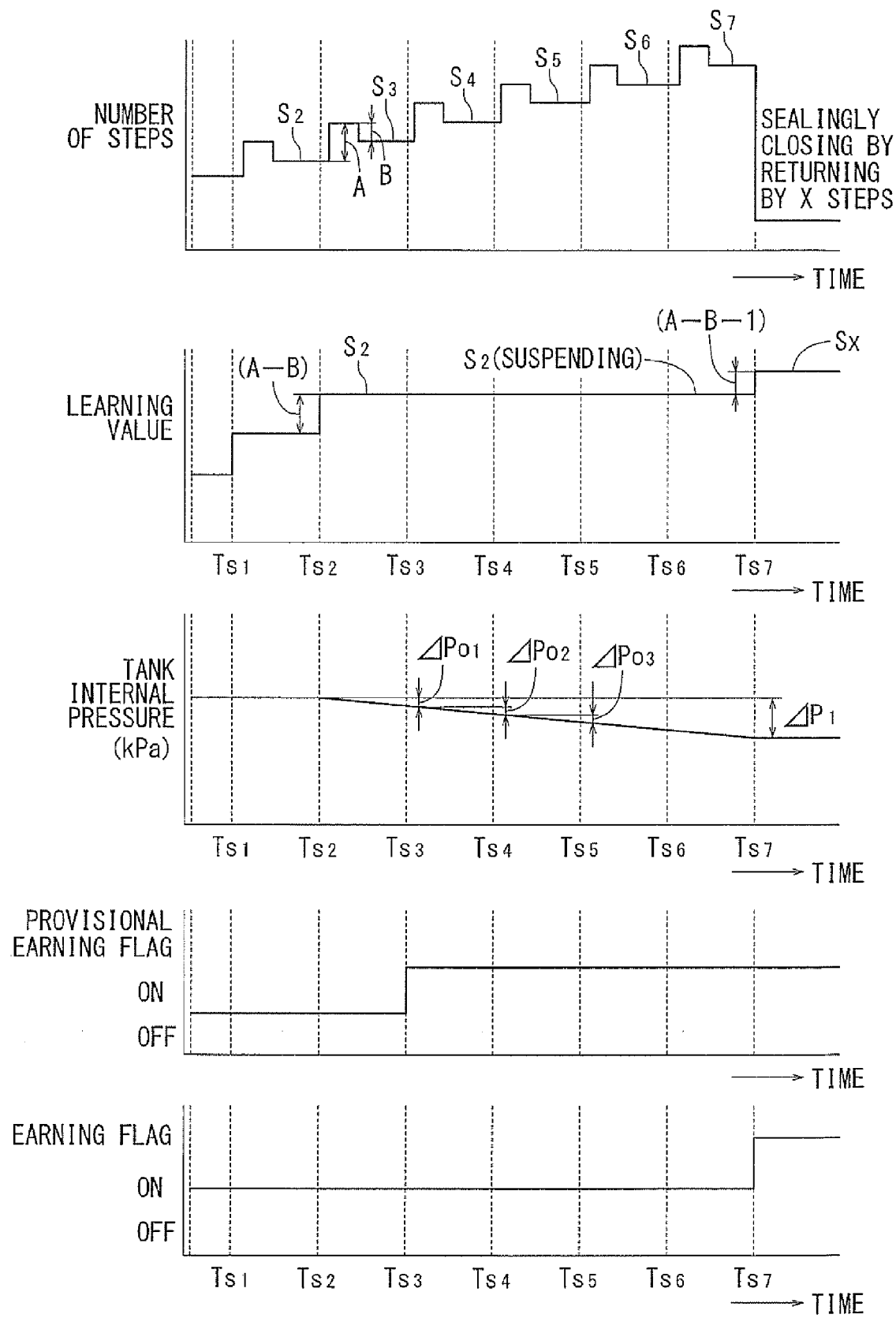
FIG. 14 is a graph illustrating a learning control according to a modification.

That is, as shown in a graph of the tank internal pressure in FIG. 14, when it is detected that the tank internal pressure has been reduced by the first reference value ($\Delta P_{01}$) or more (see time $T_{S3}$) with respect to the detection value at the last time (see time $T_{S2}$), the provisional learning flag is turned on at time $T_{S3}$. At that time, the number of steps (stroke amount) of the stepping motor 50 is $S_3$ steps as shown in the upper part of FIG. 14; however, the updating of the stroke amount is prohibited due to turning-on of the provisional learning flag. That is, the stroke amount ($S_2$ steps) updated in the last process is suspended. And, if the reduction in the tank internal pressure in the next process, i.e., a second reference value ($\Delta P_{02}$), is larger than the first reference value ($\Delta P_{01}$), there is maintained a state in which the provisional learning flag is on. Further, if the reduction in the tank internal pressure in the next process, i.e., a third reference value ($\Delta P_{03}$), is larger than the second reference value ($\Delta P_{02}$), there is maintained a state in which the provisional learning flag is on. And, eventually, when the reduction amount accumulation value of the tank internal pressure has become to be the predetermined value ($\Delta P_1$) or more, the learning flag is turned on.

As a result, (A−B−1=1) step is added to the stroke amount ($S_2$ steps) suspended due to turning-on of the provisional learning flag, the resultant value is stored as the learning value Sx for the valve opening start position, and the learning control is then completed. And, at the stage where the learning control has been completed, the stepping motor 50 of the shutoff valve 40 is rotated by X steps in the valve closing direction to restore the valve guide 60 and the valve member 70 to the valve closing position. Here, after turning-on of the provisional learning flag, for example, if the reduction in the tank internal pressure, i.e., the second reference ($\Delta P_{02}$), has become smaller than the first reference value ($\Delta P_{01}$), it is determined that this is not a reduction in the tank internal pressure due to the valve opening start of the shutoff valve 40, and the provisional learning flag is turned off.

In the present embodiment, the stepping motor 50 is rotated in the valve opening direction by A steps (e.g., 4 steps) and is maintained in this state for the fixed period of time $T_1$ (e.g., 500 milliseconds); then, it is rotated in the valve closing direction by B steps (e.g., −2 steps) and is maintained in this state for the fixed period of time $T_2$ (e.g., 1 sec), and the tank internal pressure is detected at a predetermined point in time during maintaining for the fixed period of time $T_2$. It should be noted, however, that the value (A steps) by which the stepping motor 50 is rotated in the valve opening direction, and the value (B steps) by which it is rotated in the valve closing direction, may be changed as appropriate. Further, the fixed period of time $T_1$ when rotated in the valve opening direction, and the fixed period of time $T_2$ when rotated in the valve closing direction, may also be changed as appropriate. Further, while in the present embodiment described above the stepping motor 50 is used as a motor of the shutoff valve 40, it is also possible to use a DC motor, etc. instead of the stepping motor 50.

In the following, a fuel vapor processing apparatus 20 according to a second embodiment of the present invention will be described with reference to FIG. 5 and FIGS. 15 through 19. In the fuel vapor processing device 20 according to the present embodiment, it is configured such that, in the learning control, it is possible to independently perform a control for changing the stroke amount of the shutoff valve 40 (hereinafter referred to as a stroke control), and a control for detecting that the internal pressure of the fuel tank 15 has been reduced by a predetermined value ($\Delta P_1$) or more (hereinafter referred to as an internal pressure detection control). The other construction of the fuel vapor processing apparatus 20 according to the present embodiment is of the same construction as the fuel vapor processing apparatus 20 according to the first embodiment, so a description thereof is omitted by affixing the same reference numerals.

Figure 15:
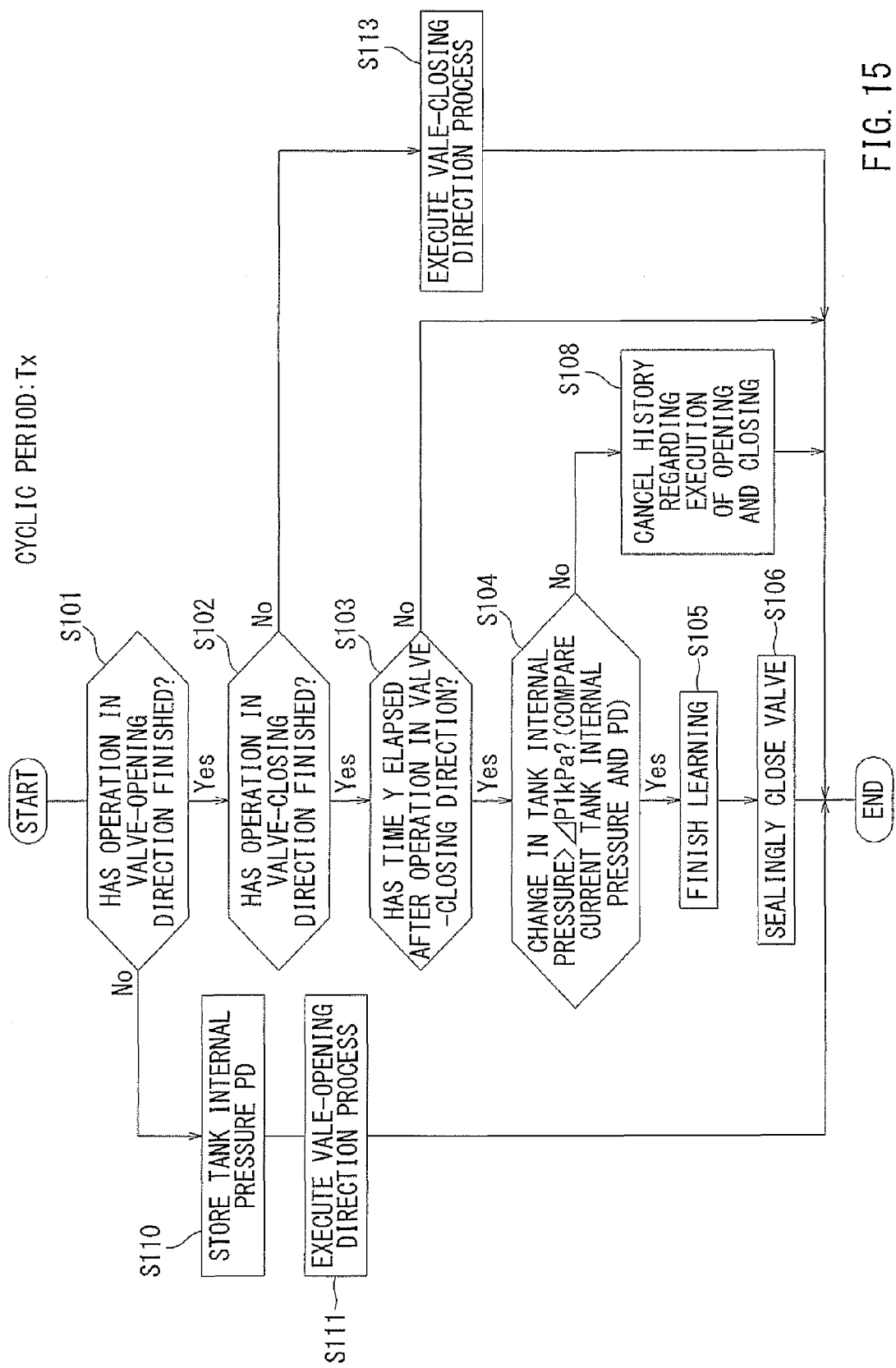
FIG. 15 is a flowchart illustrating a control in which a stroke amount of a shutoff valve is varied in a learning control for a fuel vapor processing apparatus according to a second embodiment of the present invention.
Figure 16:
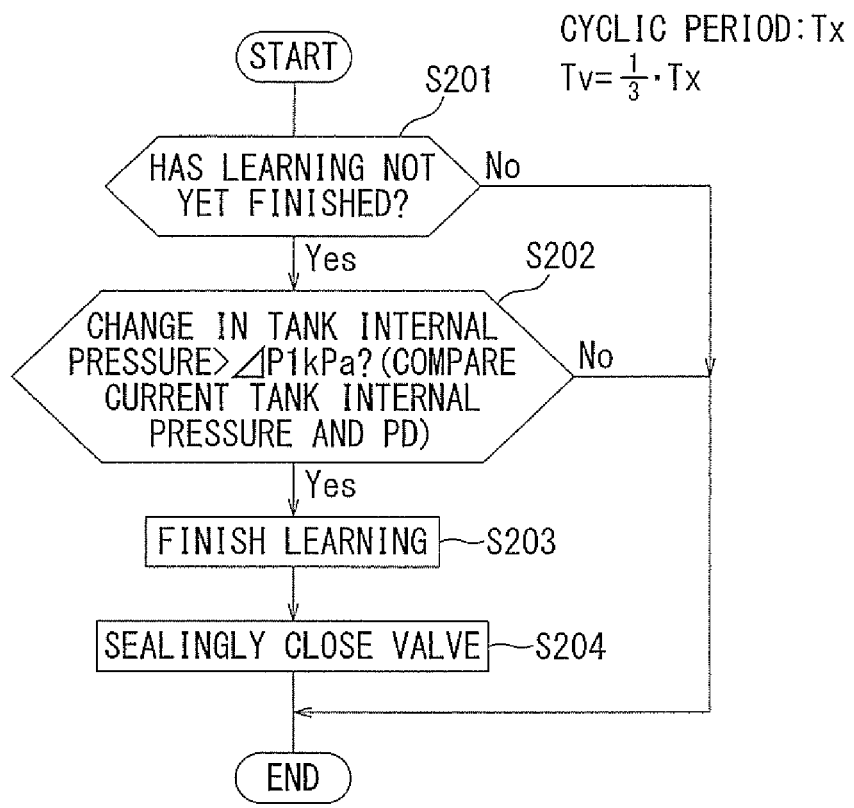
FIG. 16 is a flowchart illustrating a control in which a reduction by an amount not less than (i.e., greater than or equal to) a predetermined value of an internal pressure of a fuel tank is detected in the learning control.

In the learning control of the fuel vapor processing apparatus 20 according to the present embodiment, the stroke control of the shutoff valve 40 is executed based on a flowchart of FIG. 15. Here, the process illustrated in the flowchart of FIG. 15 is repeatedly executed for each predetermined cyclic period Tx based on a program stored in a memory of the ECU 19 (see FIG. 1). In the present embodiment, the predetermined cyclic period Tx is set, for example, to be Tx=300 milliseconds. The internal pressure detection control in the learning control is executed based on a flowchart of FIG. 16. Here, the process illustrated in the flowchart of FIG. 16 is repeatedly executed for each predetermined cyclic period Tv based on a program stored in the memory of the ECU 19. In the present embodiment, the predetermined cyclic period Tv is set, for example, to be ⅓×Tx=100 milliseconds. A graph of FIG. 17 is that illustrating chronological changes in the stroke control of the shutoff valve 40 and in the internal pressure detection control; in the graph of FIG. 5, there is illustrated in detail the state after the rotation of the stepping motor 50 of the shutoff valve 40 in the valve opening direction to the valve closing limit of S0 steps.

Next, the concrete procedures of the learning control according to the present embodiment will be described with reference to FIG. 5 and FIGS. 15 through 17. As shown in the upper part of FIG. 5, when the ignition switch of the engine is turned on, the stepping motor 50 is rotated by 4 steps (−4 steps) in the valve closing direction, and the shutoff valve 40 is restored to the initialized state (0 step). Next, the stepping motor 50 rotates at a high speed in the valve opening direction to the valve closing limit of S0 steps on the design of the shutoff valve 40. Further, as shown in the lower part of FIG. 5, the internal pressure of the fuel tank 15 (tank internal pressure) is repeatedly detected for each predetermined cyclic period Tv.

And, in the state in which the shutoff valve 40 is at the valve closing limit position, S0 step (stroke amount S0), (see time $T_1$ in the upper part of FIG. 17), the processes illustrated in the flowcharts of FIGS. 15 and 16 are started. That is, in step S101 in FIG. 15, it is determined whether or not the stepping motor 50 of the shutoff valve 40 has been rotated in the valve opening direction by A steps (e.g., 4 steps) (i.e., whether or not the shutoff valve 40 has been operated in the valve opening direction by A steps). At time $T_1$ in FIG. 17, the shutoff valve 40 has not been operated by A steps in the valve opening direction yet, so that the determination in steps S101 in FIG. 15 is NO, and a tank internal pressure $PD_1$ at that time is stored (step S110); further, the shutoff valve 40 is operated by A steps in the valve opening direction (step S111), and the process at this time is completed. By the process illustrated in the flowchart of FIG. 16, the learning control is not completed yet (determination in step S201 is YES), so that, in step S202, the current tank internal pressure P and the tank internal pressure $PD_1$ stored at time $T_1$ in FIG. 17 are compared with each other. At times $T_1$, $T_1a$, and $T_1b$, the current tank internal pressure P has not been reduced from the tank internal pressure $PD_1$ by $\Delta P_1$ or more yet, so that determination in step S202 is NO. Thus, according to the process illustrated in the flowchart of FIG. 16, the processes in steps S201 and S202 are repeatedly executed for a predetermined cyclic period Tv (=100 milliseconds) until the current tank internal pressure P is reduced from the tank internal pressure $PD_1$ by $\Delta P_1$ or more.

Figure 17:
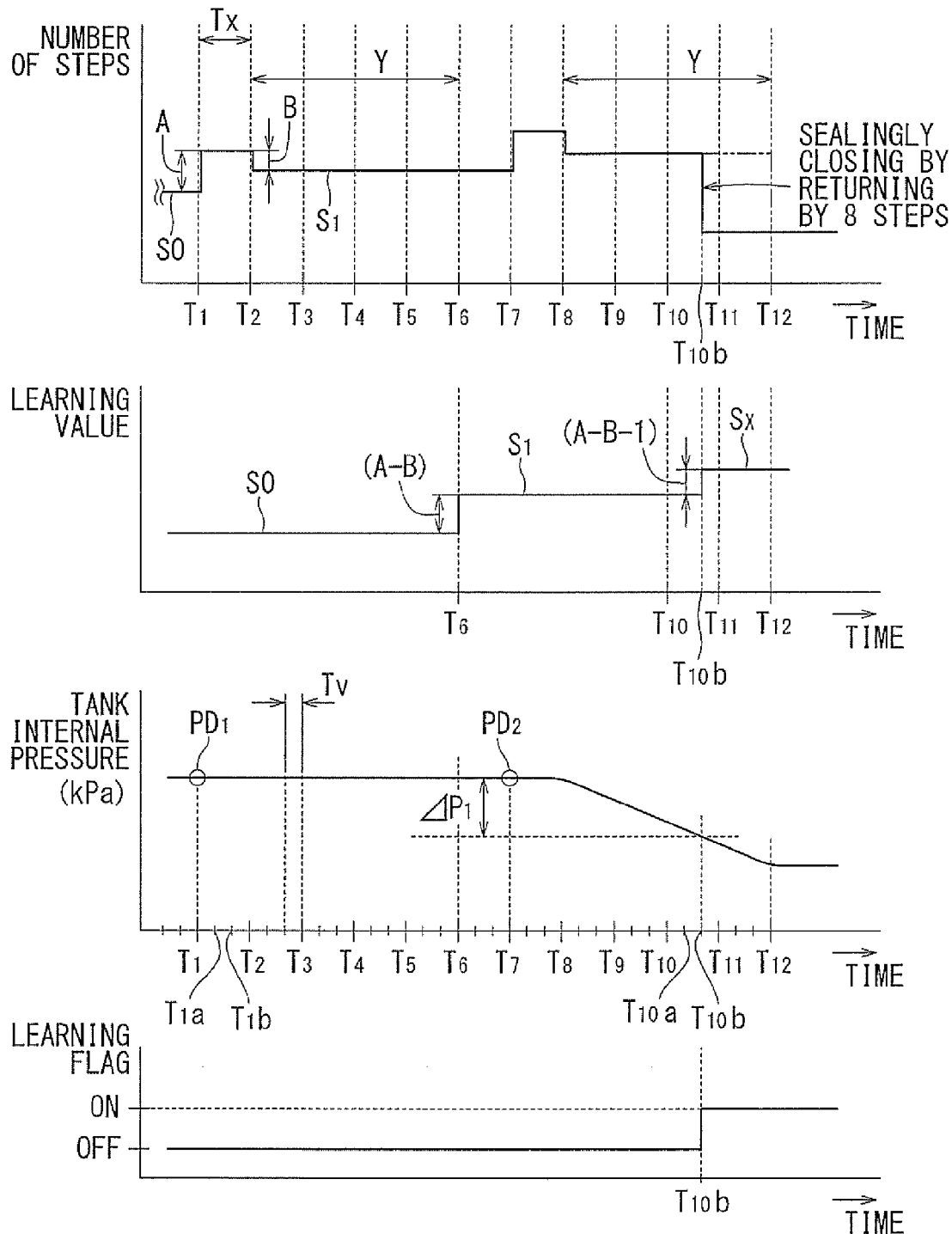
FIG. 17 is a graph illustrating the learning control.

In the next process in the flowchart of FIG. 15 (the process after the predetermined cyclic period Tx (=300 milliseconds), that is, at time $T_2$ in FIG. 17, the shutoff valve 40 has been operated by A steps in the valve opening direction (determination in step S101 is YES), so that it is determined in step S102 whether or not the shutoff valve 40 has been operated in the valve closing direction by B steps (e.g., −2 steps). At time $T_2$ in FIG. 17, the shutoff valve 40 has not been operated in the valve closing direction by B steps yet, so that determination in step S102 in FIG. 15 is NO, and, in step S113, there is conducted a process of operating the shutoff valve 40 in the valve closing direction by B steps, and the process is completed. That is, if the shutoff valve 40 is operated in the valve opening direction by A steps, there is maintained the state of the operation in the valve opening direction for a period of time equal to the cyclic period Tx (=300 milliseconds) of the flowchart of FIG. 15.

In the next process of the flowchart in FIG. 15, i.e., at time $T_3$ in FIG. 17, the operation of the shutoff valve 40 in the valve opening direction by A steps and the operation thereof in the valve closing direction by B steps have been completed (determination in steps S101 and S102 is YES), so that it is determined whether or not time Y has elapsed after the operation in the valve closing direction by B steps (step S103). Here, time Y is set, for example, to the predetermined cyclic period Tx×4 (time Y=1200 milliseconds). At time $T_3$ in FIG. 17, time Y has not elapsed yet (determination in step S103 is NO), so that the process at this time is completed. In this way, the processes of steps S101, S102, and S103 are repeated, and, when time Y has elapsed (determination in step S103 is YES; see time $T_6$ in FIG. 17), the current tank internal pressure P and the tank internal pressure $PD_1$ stored at time $T_1$ are compared with each other in step S104. At time $T_6$ in FIG. 17, the current tank internal pressure P has not been reduced from the tank internal pressure $PD_1$ by $\Delta P_1$ or more yet, so that determination in step S104 is NO.

For this reason, in order to make it possible to perform the next A-step operation in the valve opening direction and the next B-step operation in the valve closing direction, the opening/closing execution history of the shutoff valve 40 is cleared in step S108. Further, as shown in FIG. 17, the learning value is updated to a value $S_1$, which is obtained by adding the difference between the A-step operation in the valve opening direction this time and the B-step operation in the valve closing direction this time, (A−B=2), to the valve closing limit position, S0 steps (stroke amount S0) on the design of the shutoff valve 40. Here, in parallel with the process of the flowchart of FIG. 15, the processes in steps S201 and S202 of the flowchart of FIG. 16 are repeatedly executed in the predetermined cyclic period Tv (=100 milliseconds).

In the next process in the flowchart of FIG. 15, that is, at time $T_7$ in FIG. 17, the opening/closing execution history of the shutoff valve 40 has been cleared, so that the A-step operation in the valve opening direction at this time of the shutoff valve 40 is not conducted, so that determination in step S101 is NO. Therefore, a tank internal pressure $PD_2$ is stored at time $T_7$ in FIG. 17 (step S110); and, further, the A-step operation in the valve opening direction of the shutoff valve 40 is conducted (step S111). And, as in the case of times $T_2$ through $T_6$ described above, the A-step valve opening state of the shutoff valve 40 is maintained for a period of time Tx; then, the B-step operation in the valve closing direction is conducted, and the B-step valve closing state is maintained for the period of time Y. If, in this state, the current tank internal pressure P is reduced from the tank internal pressure $PD_2$ at time $T_7$ in FIG. 17 by $\Delta P_1$ or more as indicated by time $T_{10}b$ in FIG. 17, determination in step S202 in the flowchart of FIG. 16 is YES. Therefore, a learning completing process is conducted in step S203. That is, as shown in FIG. 17, the learning flag is turned on, and it is determined that the opening of the shutoff valve 40 has been started. And, a value obtained by adding (A−B−1=1) step to the stroke amount $S_1$ updated in the last process (time $T_6$ in FIG. 17), is stored as the learning value Sx for the valve opening start position. Next, in step S204, the shutoff valve 40 is restored by 8 steps in the valve closing direction to close the shutoff valve 40.

When the learning completing processing, etc. (see time $T_{10}b$ in FIG. 17) are being conducted according to the process in the flowchart of FIG. 16, the processes in steps S101, S102, and S103 are repeatedly conducted in the flowchart of FIG. 15. And, when the period of time Y has elapsed at time $T_{12}$ in FIG. 17 (determination in step S103 in FIG. 15 is YES), the current tank internal pressure P and the tank internal pressure $PD_2$ stored at time $T_7$ are compared with each other in step S104. As described above, the current tank internal pressure P has been reduced from the tank internal pressure $PD_2$ by $\Delta P_1$ or more, so that the learning completing process is conducted, and the shutoff valve 40 is closed (steps S105 and S106). Therefore, with respect to the process in the flowchart of FIG. 16, in the processing of the flowchart of FIG. 15, the completion of the learning control is delayed by the time from time $T_{10}b$ to time $T_{12}$ in FIG. 17. It is also possible to complete the process in the flowchart of FIG. 15 when the learning completing processing or the like is being conducted according to the process in the flowchart of FIG. 16

Next, a modification of the fuel vapor processing apparatus 20 according to Embodiment 2 will be described with reference to FIGS. 18 and 19. In the fuel vapor processing apparatus 20 according to the modification, the stroke control flowchart (FIG. 15) for the shutoff valve 40 is improved, and there is no change in the internal pressure detection control flowchart shown in FIG. 16.

Figure 18:
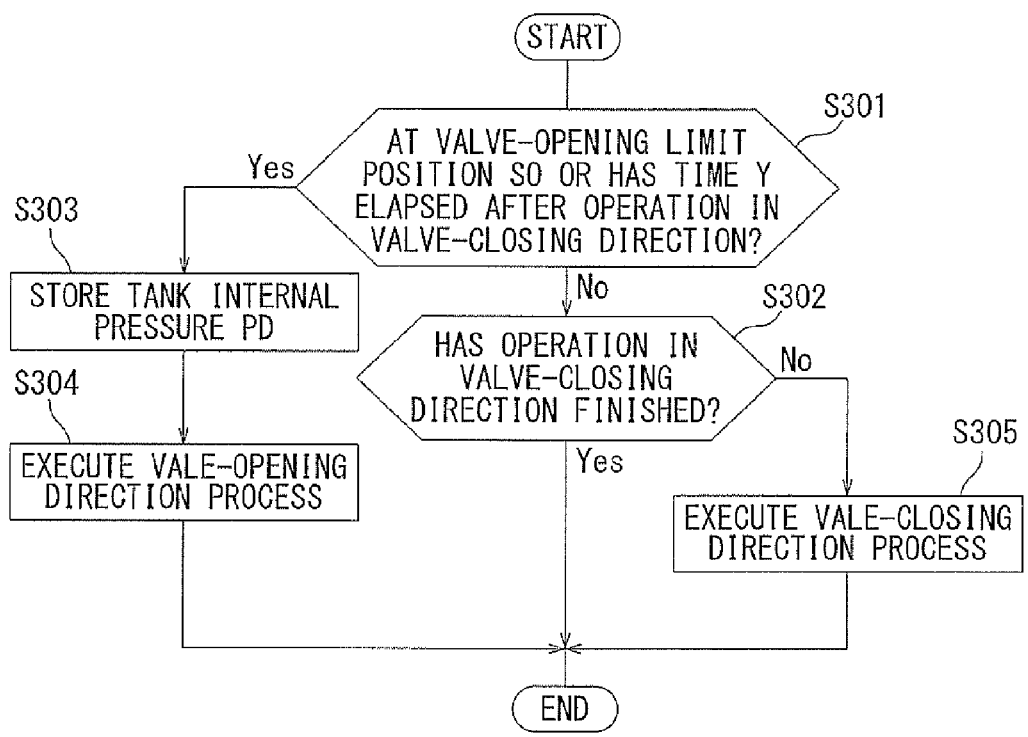
FIG. 18 is a flowchart illustrating a control in which a stroke amount of a shutoff valve is varied in a learning control according to a modification.
Figure 19:
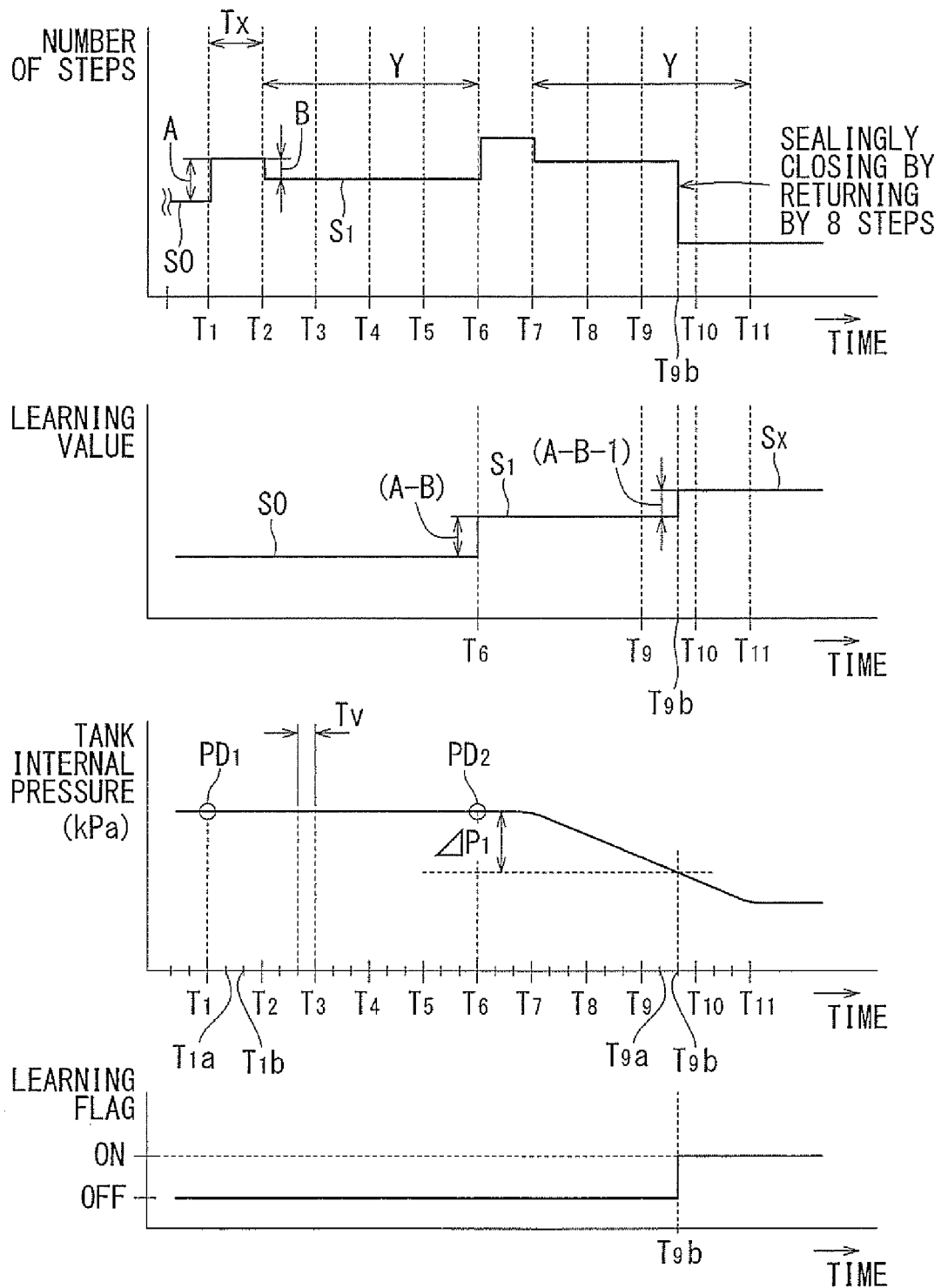
FIG. 19 is a graph illustrating a learning control according to a modification.

First, after the shutoff valve 40 is operated to the valve closing limit position S0 (stroke amount S0) (see time $T_1$ in FIG. 19), the processes shown in the flowcharts of FIGS. 16 and 18 are executed. That is, determination in step S301 in FIG. 18 becomes YES, and the tank internal pressure $PD_1$ at time $T_1$ in FIG. 19 is stored (step S303). Further, the A-step operation in the valve opening direction of the shutoff valve 40 is conducted (step S304), and the process at this time is completed. In the process shown in the flowchart of FIG. 16, the processes in steps S201 and S202 are repeatedly executed in a predetermined cyclic period Tv.

In the next process shown in the flowchart of FIG. 18 (see time $T_2$ in FIG. 19), the shutoff valve 40 is not at the valve closing limit position S0 steps; further, the B-step operation in the valve closing direction is not being conducted, so that determination in step S301 is NO. Further, determination in step S302 is also NO, so that the B-step operation in the valve closing direction of the shutoff valve 40 is conducted in step S305, and the process at this time is completed. At time $T_3$ in FIG. 19, the period of time Y has not elapsed after the execution of the B-step operation in the valve closing direction (determination in step S301 is NO); further, the B-step operation in the valve closing direction has been completed (determination in step S302 is YES), so that the process is completed. And, the processes in steps S301 and S302 in FIG. 18 are repeatedly conducted; and when the period of time Y has elapsed after the completion of the B-step operation in the valve closing direction (time $T_6$ in FIG. 19), determination in step S301 becomes YES. Therefore, the tank internal pressure PD2 at time $T_6$ in FIG. 19 is stored (step S303). Further, the A-step operation in the valve opening direction of the shutoff valve is conducted (step S304).

In this way, according the process shown in the flowchart of FIG. 18, it is possible to repeatedly execute an operation in which the A-step valve opening direction state is maintained for the period of time Tx and in which the B-step valve closing direction state is maintained for the period of time Y. Therefore, there is no need to perform the process of canceling the opening/closing execution history of the shutoff valve 40 as shown in the flowchart process of FIG. 15, and it is possible to conduct the A-step operation in the valve opening direction immediately after the period of time Y has elapsed after the completion of the B-step operation in the valve closing direction of the shutoff valve 40. Therefore, it is possible to shorten the requisite time for the learning control. And, when the current tank internal pressure P has been reduced from the tank internal pressure $PD_2$ at time $T_6$ in FIG. 19 by $\Delta P_1$ or more (determination in step S202 in the flowchart of FIG. 16 is YES) as indicated at time $T_9b$ in FIG. 19, the learning completing process is conducted in step S203. Here, in the present embodiment, the control cyclic period of the stroke control of the shutoff valve 40 is set to the period of time Tx (=300 milliseconds), and the control cyclic period for the internal pressure detection control is set to Tv (=100 milliseconds). However, the concrete values may be changed as appropriate so long as the period of time Tx>the period of time Tv.

The invention claimed is:

1. A fuel vapor processing apparatus comprising:
   a canister provided with an adsorbent material adsorbing fuel vapor produced in a fuel tank;
   a shutoff valve disposed in a vapor passage connecting the canister and the fuel tank; wherein
   the shutoff valve comprises a movable valve portion and a valve seat, the movable valve portion being movable with respect to the valve seat in an axial direction, so that, when a stroke amount of the movable valve portion in an axial direction with respect to the valve seat is within a predetermined range, the shutoff valve is in a valve closing state to close the vapor passage for interrupting communication between the canister and the fuel tank; and
   a control device configured to execute a learning control in which the stroke amount is changed in the valve opening direction by repeating a process of changing the stroke amount in the valve opening direction by a first predetermined stroke and maintaining the changed stroke amount for a first period of time, and subsequently changing the stroke amount in a valve closing direction by a second predetermined stroke smaller than the first predetermined stroke and maintaining the changed stroke amount for a second period of time longer than the first period of time, and where a valve opening start position of the movable valve portion, where the shutoff valve starts to open the vapor passage, is determined based on the changed stroke amount maintained for the second period of time in a first process in which an internal pressure of the fuel tank is reduced by a predetermined value or more, or in a second process preceding the first process.

2. The fuel vapor processing apparatus as defined in claim 1, wherein, the control device is further configured to change the stroke amount to move the movable valve portion to a valve closing position within the predetermined range at a time when the reduction of the internal pressure of the fuel tank by the predetermined value or more is detected.

3. The fuel vapor processing apparatus as defined in claim 1, wherein the control device is further configured to execute a control such that the internal pressure of the fuel tank is detected with a detection cyclic period, wherein the detection cyclic period is shorter than the first period of time.

4. The fuel vapor processing apparatus as defined in claim 1, wherein the control device is further configured such that a control of changing the stroke amount of the movable valve portion of the shutoff valve and a control of detecting the reduction of the internal pressure of the fuel tank by the predetermined value or more are executed independently of each other.

5. The fuel vapor processing apparatus as defined in claim 4, wherein a control cyclic period of the control for detecting the reduction in the internal pressure of the fuel tank by the predetermined value or more is set to be smaller than a control cyclic period of the control for changing the stroke amount of the movable valve portion of the shutoff valve.

6. The fuel vapor processing apparatus according to claim 1, wherein:
   the control device is further configured to turn on a provisional learning flag when the reduction of the internal pressure of the fuel tank by a value smaller than the predetermined value is detected in a third process, and if the internal pressure of the fuel tank is reduced by the predetermined value or more in a fourth process after the third process in a state where the internal pressure of the fuel tank is continuously reduced, the valve opening start position is determined based on the changed stroke amount maintained for the second period of time in the third process in which the provisional flag is turned on or in a fifth process preceding the third process.

7. The fuel vapor processing apparatus according to claim 1, wherein:

the valve opening start position is determined based on the stroke amount maintained for the second period of time in the first process in which the internal pressure of the fuel tank is reduced by the predetermined value or more, and a difference between the first predetermined stroke and the second predetermined stroke is deducted from the stroke amount to determine the valve opening start position.

8. The fuel vapor processing apparatus according to claim 6, wherein:

the valve opening start position is determined based on the stroke amount maintained for the second period of time in the third process in which the provisional flag is turned on, and a difference between the first predetermined stroke and the second predetermined stroke is deducted from the stroke amount to determine the valve opening start position.

9. The fuel vapor processing apparatus according to claim 1, wherein:

the valve opening start position is determined based on the stroke amount maintained for the second period of time in the second process immediately before the first process in which the internal pressure of the fuel tank is reduced by the predetermined value or more, and a difference between the first predetermined stroke and the second predetermined stroke is added to the stroke amount to determine the valve opening start position.

10. The fuel vapor processing apparatus according to claim 6, wherein:

the valve opening start position is determined based on the stroke amount maintained for the second period of time in the fifth process immediately before the third process in which the provisional flag is turned on, and a difference between the first predetermined stroke and the second predetermined stroke is added to the stroke amount to determine the valve opening start position.

* * * * *